(12) United States Patent
Kishima et al.

(10) Patent No.: US 6,839,315 B2
(45) Date of Patent: Jan. 4, 2005

(54) OPTICAL HEAD AND OPTICAL PICKUP HAVING IMPROVED THERMAL COEFFICIENT MATCHING FOR THERMAL EXPANSION ADJUSTMENT

(75) Inventors: Koichiro Kishima, Kanagawa (JP); Akira Kouchiyama, Kanagawa (JP); Kenji Yamamoto, Kanagawa (JP); Gakuji Hashimoto, Saitama (JP); Atsushi Iida, Tokyo (JP)

(73) Assignee: Sony Corporation (JP)

(*) Notice: Subject to any disclaimer, the term of this patent is extended or adjusted under 35 U.S.C. 154(b) by 484 days.

(21) Appl. No.: 09/940,469

(22) Filed: Aug. 29, 2001

(65) Prior Publication Data

US 2002/0027864 A1 Mar. 7, 2002

(30) Foreign Application Priority Data

Sep. 1, 2000 (JP) .................................... P2000-265275

(51) Int. Cl.[7] .............................................. G11B 7/00
(52) U.S. Cl. .............................. 369/112.23; 369/112.25
(58) Field of Search ..................... 369/112.01, 112.23, 369/112.24, 112.25, 112.26, 118, 44.14, 44.22, 244

(56) References Cited

U.S. PATENT DOCUMENTS 6,125,008 A * 9/2000 Berg et al. ............... 360/264.4
6,522,617 B1 * 2/2003 Berg et al. ............. 369/112.01
6,549,346 B2 * 4/2003 Wada et al. ................ 359/814

* cited by examiner

Primary Examiner—Paul W. Huber
(74) Attorney, Agent, or Firm—Rader, Fishman & Grauer PLLC; Ronald P. Kananen

(57) ABSTRACT

An optical head, able to reduce thermal stress generated in an optical lens mounted on a bobbin, having a bobbin formed with a center hole and an optical lens mounted on the bobbin via a thermal expansion adjustment member 40 formed with an opening. The optical lens has a substrate formed by an optical material different from the bobbin in coefficient of thermal expansion. The substrate has a convex part functioning as a convex lens and a flat part positioned around the convex part. The flat part is fixed to the thermal expansion adjustment member so that the convex part fits in the opening. The optical lens is placed so that a center axis of the convex part or an extension thereof passes through the center hole of the bobbin and the center axis of the convex part coincides with a center hole of the bobbin.

31 Claims, 15 Drawing Sheets

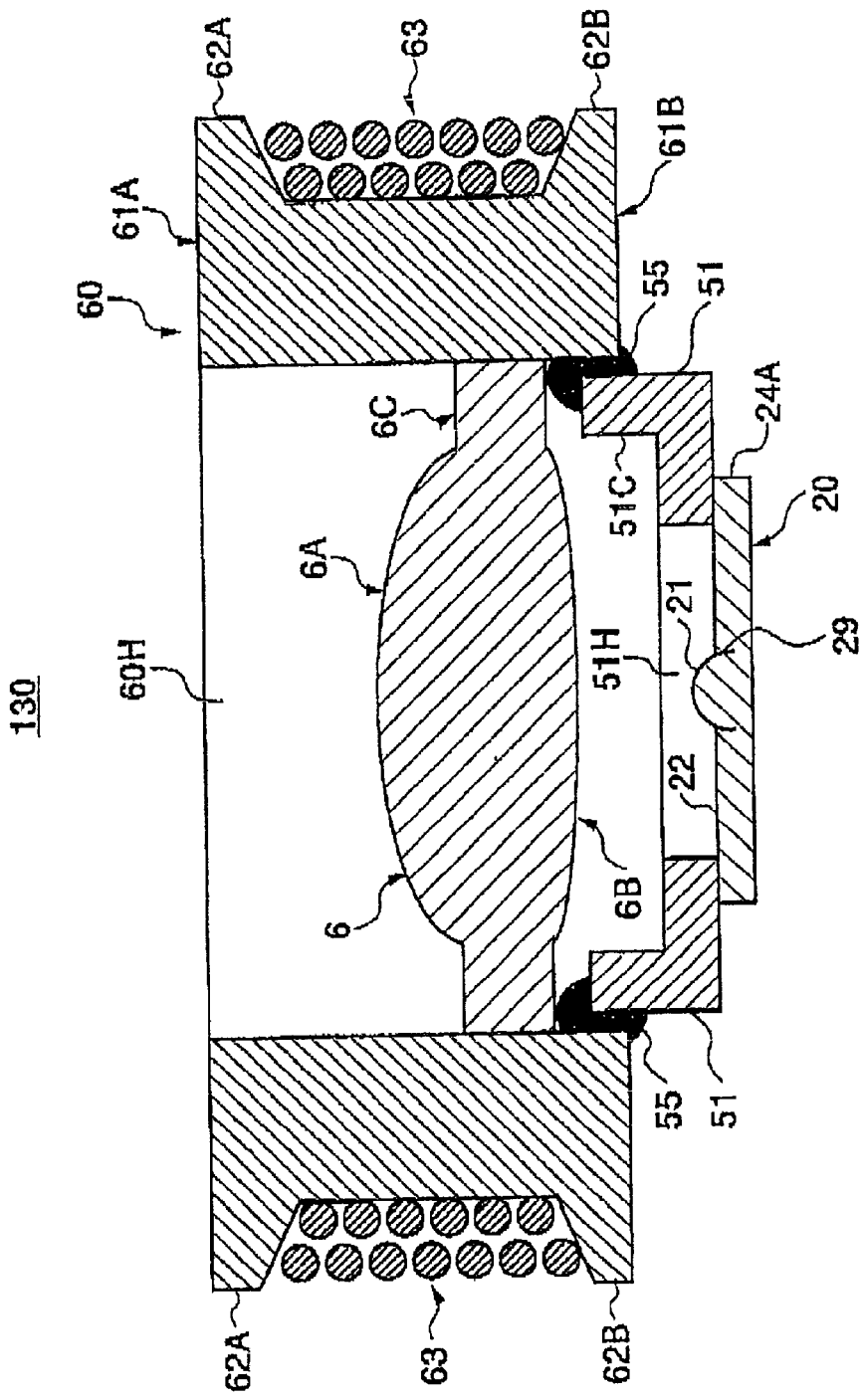

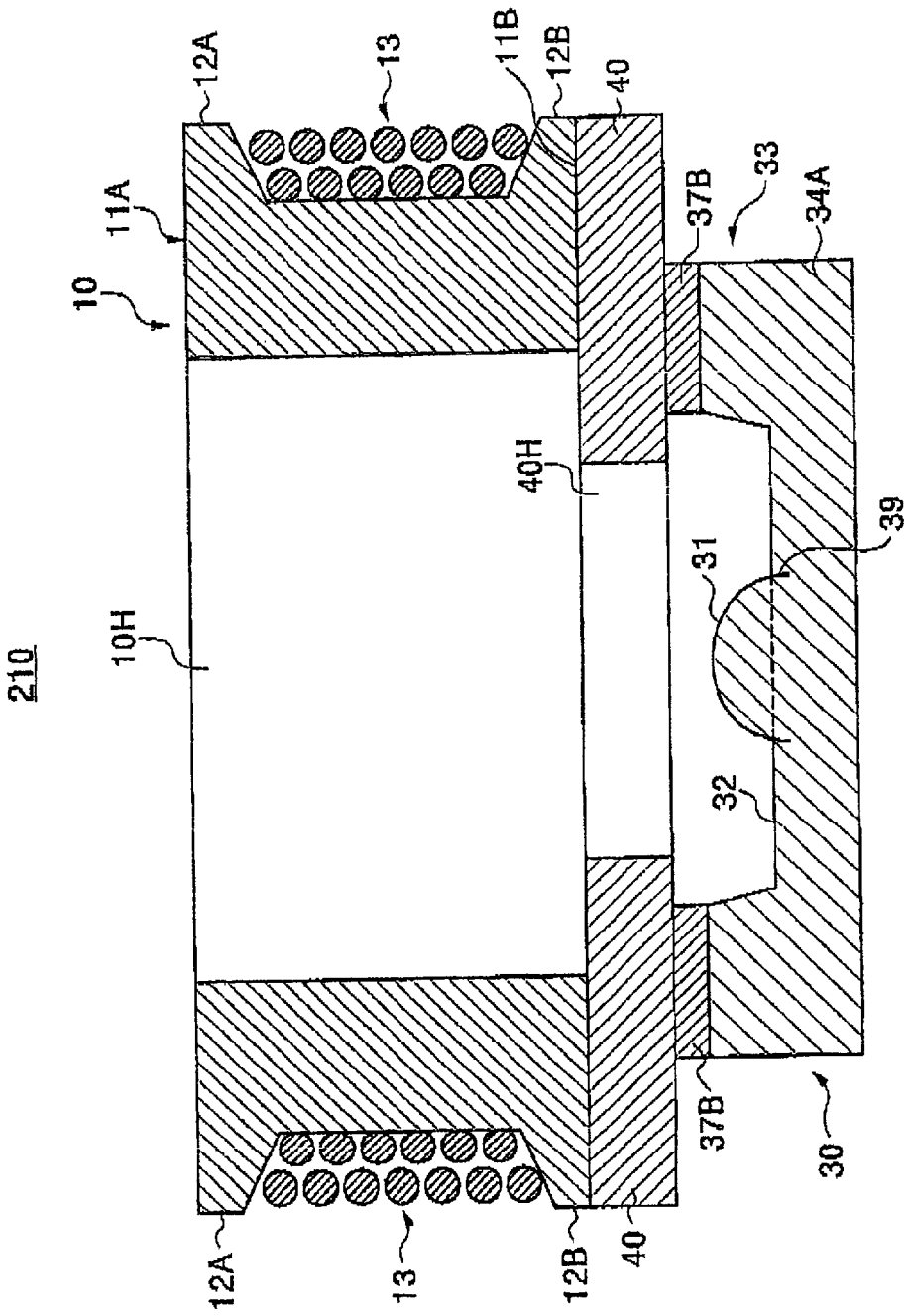

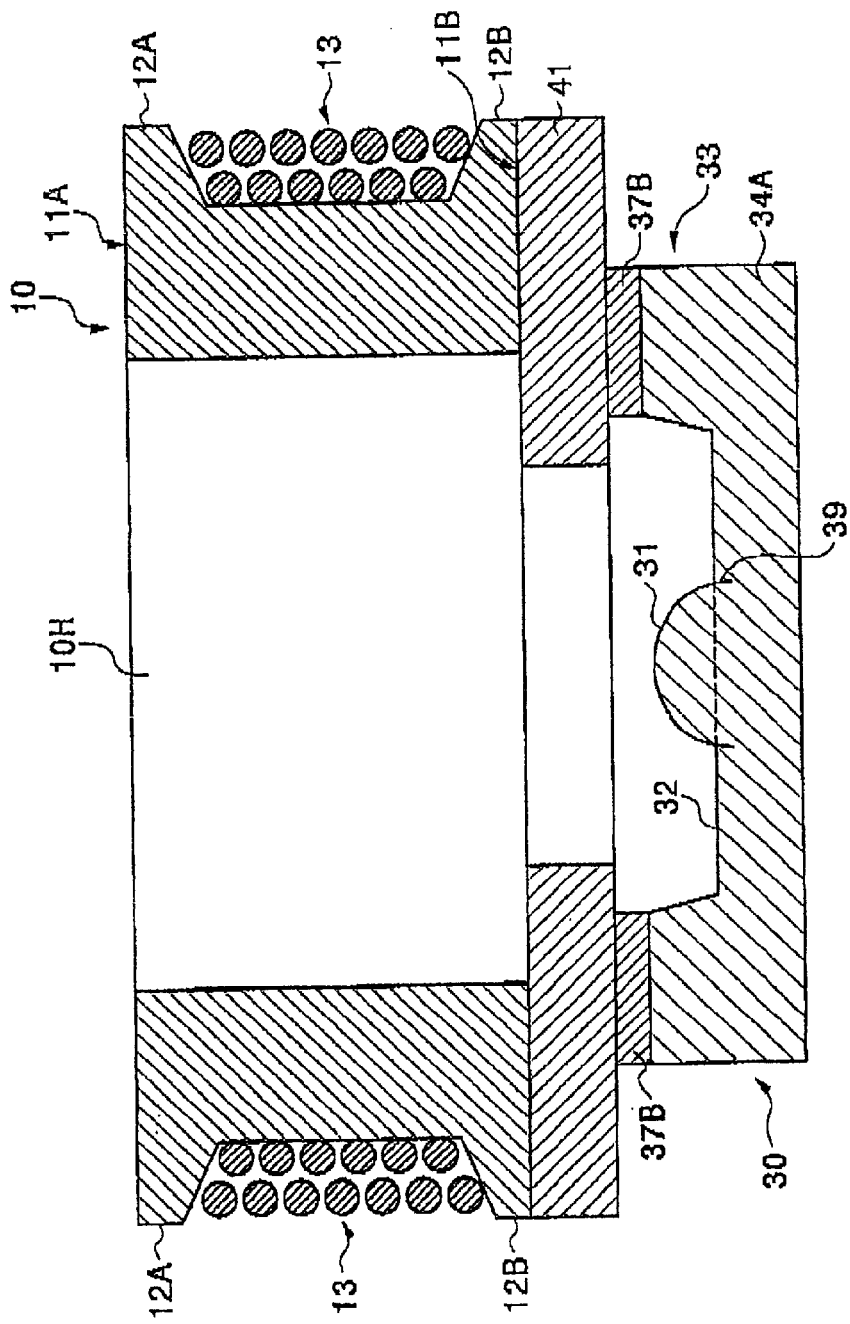

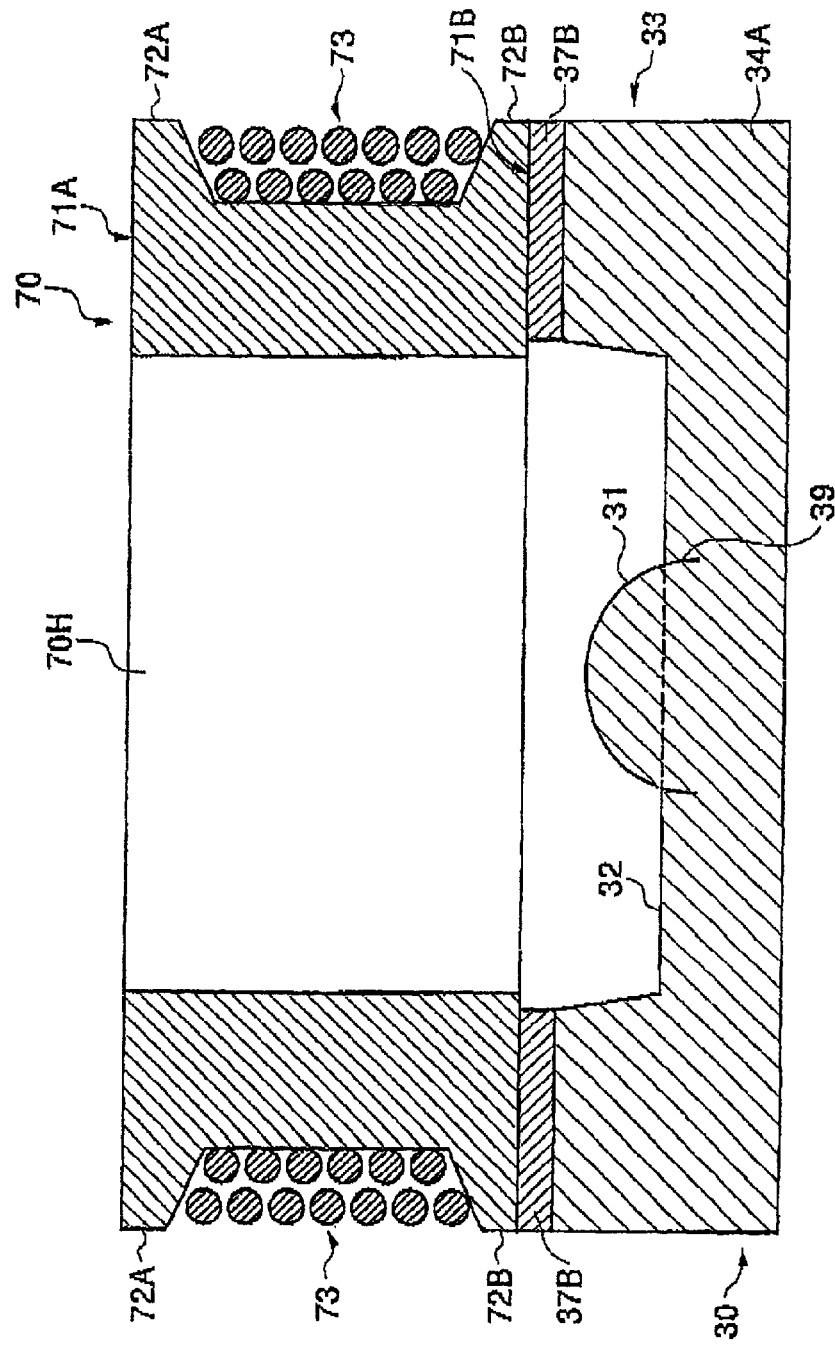

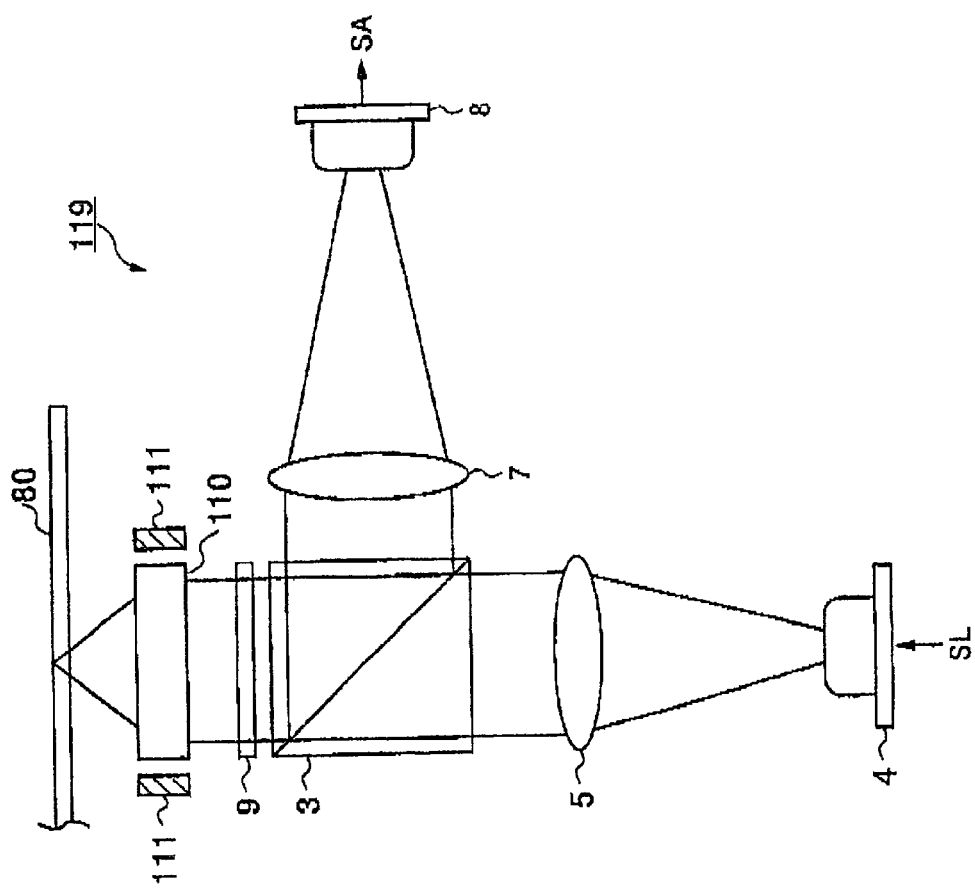

OPTICAL HEAD AND OPTICAL PICKUP HAVING IMPROVED THERMAL COEFFICIENT MATCHING FOR THERMAL EXPANSION ADJUSTMENT

BACKGROUND OF THE INVENTION

1. Field of the Invention

The present invention relates to an optical head having a bobbin and an optical lens and an optical pickup having the optical head.

2. Description of the Related Art

Recently, there has been a demand to make an optical disc storage medium higher in density. Therefore, in optical disc apparatuses, research and development have been underway for shortening the wavelength of a light source and for enlarging the numerical aperture (NA) of a reproduction optical system. Further, it is desired to increase the transfer rate of data in such a reproduction optical system.

When shortening the wavelength of the light source and enlarging the NA of the reproduction optical system, in addition to the fact that the size of an optical spot becomes small, the focal depth becomes shallower, so it is desired to reduce the focus servo error. Further, a data recording width (track width) of the optical disc storage medium becomes narrower, so it is desired to reduce the tracking servo error.

For increasing the data transfer rate, it is desired to make the bandwidth of an actuator used for the focus servo and tracking servo higher. As a result, two improvements are desired for servo characteristics: reduction of the remaining amount of error and raising the bandwidth. An actuator can be improved in its servo characteristics by reducing the weight of the actuator.

FIG. 1 is a view of the configuration illustrating an optical head and show a schematic cross-section of the optical head.

This optical head 100 has a bobbin 10 and an optical lens 20.

At an outer circumference of the bobbin 10, a convex part 12A is formed along one surface (upper surface) 11A of the bobbin 10 and a convex part 12B is formed along the other surface (lower surface) 11B of the bobbin 10.

A center hole 10H is formed at the bobbin and a center axis of the center hole 10H is perpendicular or approximately perpendicular to the upper and lower surfaces 11A and 11B of the bobbin 10.

In the bobbin 10, a coil 13 is wound at a concave part between circumferential edges formed by the convex parts 12A and 12B. By arranging magnets outside of the coil 13 and supplying a driving current to the coil 13, it is possible to move the bobbin 10 and the optical lens 20 as one part.

The optical lens 20 has a convex part 21 functioning as a convex lens and a flat part 22 positioned around this convex part 21. A thickness of a substrate 24A at the flat part 22 is constant or approximately constant and is smaller than the thickness of the substrate 24A at the convex part 21. At the outer circumference of the convex part 21 is formed a groove 29 called a "trench" when forming the convex part 21 by etching. This groove 29 clearly separates the convex part 21 and the flat part 22.

A circumferential edge part of the surface of the flat part closely contacts the lower surface 11B of the bobbin 10. The convex part 21 is placed so as to fit into the center hole 10H of the bobbin 10.

The center axis of the center hole 10H of the bobbin 10 and an optical axis of the optical lens 20 coincide or substantially coincide.

The bobbin 10 is often formed by a plastic formed by injection molding for the purpose of lightening the weight and/or facilitating processing.

Because a plastic material has a large coefficient of thermal expansion, when mounting the optical lens 20 on the plastic material directly, due to the difference of the coefficient of thermal expansion between the bobbin 10 and the optical lens 20, thermal stress is often generated in the optical lens 20.

For example, when using silica-based glass as the optical lens 20, the coefficient of thermal expansion of the silica-based glass is about $0.4\times10^{-6}/°$ C., while when using polystyrene as the bobbin 10, the coefficient of thermal expansion of polystyrene is about $50\times10^{-6}/°$ C. Thus, there exists over a 100-fold difference in the coefficient of thermal expansion.

Since the groove 29 is formed around the convex part 21 of the optical lens 20, stress easily concentrates in the groove 29.

Further, there is a possibility of the optical lens 20 changing in refractive index due to the photoelastic effect arising from the thermal stress.

SUMMARY OF THE INVENTION

An object of the present invention is to provide an optical head capable of reducing the thermal stress generated in an optical lens mounted on a bobbin.

Another object of the present invention is to provide an optical pickup having the optical head.

According to a first aspect of the present invention, there is provided an optical head having a bobbin formed with a center hole and a first optical lens mounted on the bobbin via a thermal expansion adjustment member formed with an opening, wherein the first optical lens has a substrate formed by an optical material different from the bobbin in coefficient of thermal expansion, the substrate has a convex part functioning as a convex lens and a flat part positioned around the convex part, the flat part is fixed to the thermal expansion adjustment member so that the convex part fits in the opening, and the first optical lens is placed so that a center axis of the convex part or an extension thereof passes through the center hole of the bobbin.

Preferably, the coefficient of thermal expansion of the thermal expansion adjustment member is a value between the coefficient of thermal expansion of the bobbin and the coefficient of thermal expansion of the first optical lens.

Preferably, the thermal expansion adjustment member is fixed to the bobbin.

For example, the thermal expansion adjustment member may be fixed to the bobbin via a spacer, or a second optical lens may be arranged at the center hole of the bobbin.

Preferably, the thermal expansion adjustment member is an optical material having a constant or substantially constant thickness and is formed by the same material as the optical material of the first optical lens, and the height of the convex part from the surface of the flat part is lower than the thickness of the thermal expansion adjustment member.

Preferably, the center axis of the convex part coincides or substantially coincides with the center axis of the center hole of the bobbin, a groove is formed around the convex part, a coil is wound around an outer circumference of the bobbin, the material of the bobbin is plastic, and the material of the first optical lens is glass.

According to a second aspect of the present invention, there is provided an optical head having a bobbin formed with a center hole and an optical lens mounted on the bobbin via a thermal expansion adjustment member, wherein the optical lens has a substrate formed by an optical material different from the bobbin in coefficient of thermal expansion, the substrate has a convex part functioning as a convex lens, a flat part positioned around the convex part, and an outer circumference part positioned around the flat part, wherein a thickness of the outer circumference part is greater than that of the convex part, the outer circumference part is fixed to the thermal expansion adjustment member, and the optical lens is placed so that a center axis of the convex part or an extension thereof passes through the center hole of the bobbin.

Preferably, the coefficient of thermal expansion of the thermal expansion adjustment member is a value between the coefficient of thermal expansion of the bobbin and the coefficient of thermal expansion of the optical lens.

Preferably, the thermal expansion adjustment member is fixed to the bobbin.

Preferably, the thermal expansion adjustment member is an optical material having a constant or substantially constant thickness and is formed by the same material as the optical material of the optical lens.

Preferably, the thermal expansion adjustment member formed with an opening, and the optical lens is placed so that the convex part protrudes toward the opening.

For example, a mask layer is formed on a surface of the outer circumference part, and the mask layer of the outer circumference part is fixed to the thermal expansion adjustment member.

Preferably, the center axis of the convex part coincides or substantially coincides with the center axis of the center hole of the bobbin, a groove is formed around the convex part, a coil is wound around an outer circumference of the bobbin, the material of the bobbin is plastic, and the material of the optical lens is glass.

According to a third aspect of the present invention, there is provided an optical head having a bobbin formed with a center hole and an optical lens, wherein the optical lens has a substrate formed by an optical material different from the bobbin in coefficient of thermal expansion, the substrate has a convex part functioning as a convex lens, a flat part positioned around the convex part, and an outer circumference part positioned around the flat part, wherein a thickness of the outer circumference part is greater than that of the convex part, the outer circumference part is fixed to the bobbin, and the optical lens is placed so that a center axis of the convex part or an extension thereof passes through the center hole of the bobbin.

For example, a mask layer is formed on a surface of the outer circumference part and the mask layer of the outer circumference part is fixed to the bobbin.

Preferably, the center axis of the convex part coincides or substantially coincides with the center axis of the center hole of the bobbin, a groove is formed around the convex part, a coil is wound around an outer circumference of the bobbin, the material of the bobbin is plastic, and the material of the optical lens is glass.

According to a fourth aspect of the present invention, there is provided an optical pickup having an optical head functioning as an object lens part when mounted in a recording and/or reproducing apparatus of an optical storage medium and a photodetector for receiving a reflected light beam for use in recording and/or reproduction to and from the optical storage medium, wherein the optical head has a bobbin formed with a center hole and a first optical lens mounted on the bobbin via a thermal expansion adjustment member formed with an opening, the first optical lens has a substrate formed by an optical material different from the bobbin in coefficient of thermal expansion, the substrate has a convex part functioning as a convex lens and a flat part positioned around the convex part, the flat part is fixed to the thermal expansion adjustment member so that the convex part fits in the opening, and the first optical lens is placed so that a center axis of the convex part or an extension thereof passes through the center hole of the bobbin.

Preferably, the coefficient of thermal expansion of the thermal expansion adjustment member is a value between the coefficient of thermal expansion of the bobbin and the coefficient of thermal expansion of the first optical lens.

Preferably, the thermal expansion adjustment member is fixed to the bobbin.

For example, the thermal expansion adjustment member may be fixed to the bobbin via a spacer.

For example, a second optical lens may be placed at the center hole of the bobbin and a light beam supplied irradiated from a recording and/or reproducing light beam generating apparatus and passed through the second optical lens to the first optical lens.

Preferably, the thermal expansion adjustment member is an optical material having a constant or substantially constant thickness and is formed by the same material as the first optical lens, and the height of the convex part from the surface of the flat part is lower than the thickness of the thermal expansion adjustment member.

Preferably, the pickup is further provided with a magnet, the center axis of the convex part coincides or substantially coincides with the center axis of the center hole of the bobbin, a groove is formed around the convex part, a coil is wound around an outer circumference of the bobbin, the material of the bobbin is plastic, the material of the first optical lens is glass, and the magnet and the coil form an actuator for moving the bobbin.

According to a fifth aspect of the present invention, there is provided an optical pickup having an optical head functioning as an object lens part when mounted in a recording and/or reproducing apparatus of an optical storage medium and a photodetector for receiving a reflected light beam for use in recording and/or reproduction to and from the optical storage medium, wherein the optical head has a bobbin formed with a center hole and an optical lens mounted on the bobbin via a thermal expansion adjustment member, the optical lens has a substrate formed by an optical material different from the bobbin in coefficient of thermal expansion, the substrate has a convex part functioning as a convex lens, a flat part positioned around the convex part, and an outer circumference part positioned around the flat part, a thickness of the outer circumference part is greater than that of the convex part, the outer circumference part is fixed to the thermal expansion adjustment member, and the optical lens is placed so that a center axis of the convex part or an extension thereof passes through the center hole of the bobbin.

Preferably, the coefficient of thermal expansion of the thermal expansion adjustment member is a value between the coefficient of thermal expansion of the bobbin and the coefficient of thermal expansion of the optical lens.

Preferably, the thermal expansion adjustment member is fixed to the bobbin.

For example, the thermal expansion adjustment member may be an optical material having a constant or substantially constant thickness and may be formed by the same material as the optical lens, and a light beam supplied irradiated from a recording and/or reproducing light beam generating apparatus and passed through the thermal expansion adjustment member to the optical lens.

Preferably, there is formed an opening for the thermal expansion adjustment member and the optical lens is placed so that the convex part protrudes toward the opening.

For example, a mask layer is formed on a surface of the outer circumference part and the mask layer of the outer circumference part is fixed to the thermal expansion adjustment member.

Preferably, the pickup further has a magnet, the center axis of the convex part coincides or substantially coincides with the center axis of the center hole of the bobbin, a groove is formed around the convex part, the material of the bobbin is plastic, the material of the optical lens is glass, and the magnet and the coil form an actuator for moving the bobbin.

According to a sixth aspect of the present invention, there is provided an optical pickup having an optical head functioning as an object lens part when mounted in a recording and/or reproducing apparatus of an optical storage medium and a photodetector for receiving a reflected light beam for use in recording and/or reproduction to and from the optical storage medium, the optical head has a bobbin formed with a center hole and an optical lens, the optical lens has a substrate formed by an optical material different from the bobbin in coefficient of thermal expansion, the substrate has a convex part functioning as a convex lens, a flat part positioned around the convex part, and an outer circumference part positioned around the flat part, the outer circumference part is fixed to the bobbin, and the optical lens is placed so that a center axis of the convex part or an extension thereof passes through the center hole of the bobbin.

For example, a mask layer is formed on a surface of the outer circumference part and the mask layer of the outer circumference part is fixed to the bobbin.

Preferably, the pickup further has a magnet, the center axis of the convex part coincides or substantially coincides with the center axis of the center hole of the bobbin, a groove is formed around the convex part, the material of the bobbin is plastic, the material of the optical lens is glass, and the magnet and the coil form an actuator for moving the bobbin.

In the optical heads according to the first and second aspects of the present invention, since the first optical lens is mounted on the bobbin via the thermal expansion adjustment member, it is possible to adjust the difference of thermal expansion between the first optical lens and the bobbin by the thermal expansion adjustment member and to reduce the thermal stress in the first optical lens, thus it is possible to improve the reliability of the first optical lens and optical head.

In the optical head according to the third aspect of the present invention, the outer circumference part of the optical lens is mounted on the bobbin. Since the thickness of the outer circumference part is greater than that of the convex part, it is possible to adjust the difference of the thermal expansion between the optical lens and the bobbin by the thick outer circumference part and to reduce the thermal stress at the circumference of the convex part of the optical lens, thus it is possible to improve the reliability of the optical lens and the optical head.

BRIEF DESCRIPTION OF THE DRAWINGS

These and other objects and features of the present invention will become clearer from the following description of the preferred embodiments given with reference to the accompanying drawings, in which:

FIG. 4 is a sectional view of an optical head according to the related art of the present invention;

FIG. 6 is a sectional view of a third embodiment of an optical head according to the present invention;

FIG. 7 is a sectional view of a fourth embodiment of an optical head according to the present invention;

FIG. 8 is a sectional view of a fifth embodiment of an optical head according to the present invention;

FIG. 10 is a schematic structural view of a first embodiment of an optical pickup having an optical head according to the present invention;

DESCRIPTION OF THE PREFERRED EMBODIMENTS

Below, preferred embodiments will be described with reference to the accompanying drawings.

First Embodiment of Optical Head

Figure 2:
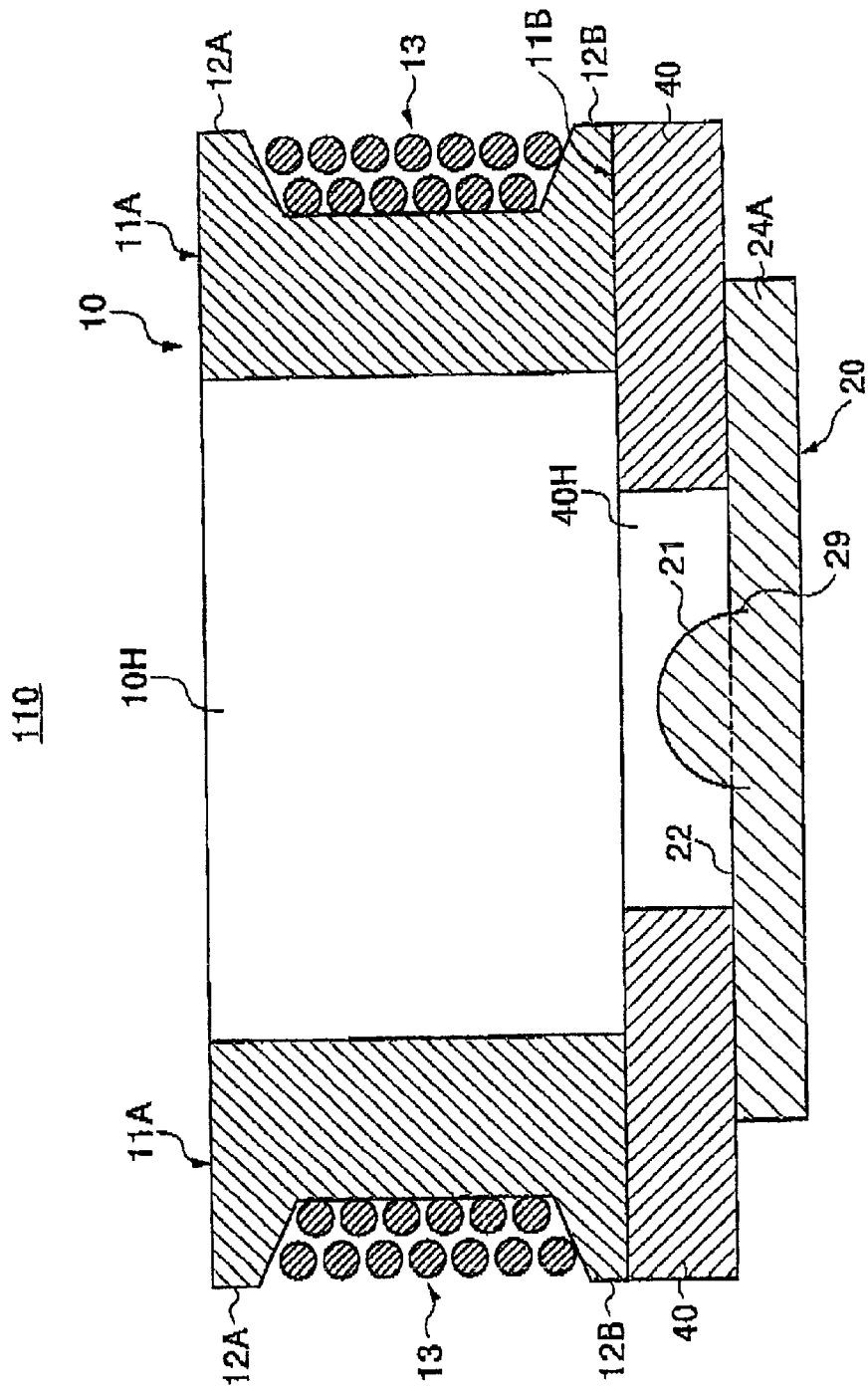
FIG. 2 is a sectional view of a first embodiment of an optical head according to the present invention.

FIG. 2 is a view of the configuration of a first embodiment of an optical head according to the present invention and a schematic cross-section of the optical head.

This optical head 110 has a bobbin 10, an optical lens 20, and a thermal expansion adjustment member 40.

At an outer circumference of the bobbin 10, a convex part 12A is formed along one surface (upper surface) 11A of the bobbin 10 and a convex part 12B is formed along the other surface (lower surface) 11B of the bobbin.

A center hole 10 is formed at the bobbin 10. A center axis of this center hole 10H is perpendicular or approximately perpendicular to the upper and lower surfaces 11A and 11B of the bobbin 10.

In the bobbin 10, a coil 13 is wound at a concave part between circumferential edges formed by the convex parts 12A and 12B. By arranging magnets outside of the coil 13 and supplying a driving current to the coil 13, it is possible to move the bobbin 10 and the optical lens 20 as one part.

The optical lens 20 has a substrate 24A formed by an optical material such as silica-based glass. This substrate 24A has a convex part 21 functioning as a convex lens and a flat part 22 positioned around this convex part 21. The thickness of the substrate 24A at the flat part 22 is constant or approximately constant and is thinner than the thickness of the substrate 24A at the convex part 21. A coefficient of thermal expansion of the optical lens 20 is smaller than that of the bobbin 10.

At an outer circumference of the convex part 21 is formed a groove 29 called a "trench" when forming the convex part 21 by etching. This groove 29 clearly separates the convex part 21 and the flat part 22.

The lower surface 11B of the bobbin 10 is in close contact with one flat surface (upper surface) of the ring-shaped thermal expansion adjustment member 40, while the other flat surface (lower surface) of the ring-shaped thermal expansion adjustment member 40 is in close contact with a front surface of the flat part 22.

The optical lens 20 is placed so that the convex part 21 fits in an opening 40H of the thermal expansion adjustment member 40. The height of the convex part 21 from the front surface of the flat part 22 is lower than the thickness of the thermal expansion adjustment member 40.

Further, the optical lens 20 is placed so that a center axis of the convex part 21 or an extension thereof passes through the center hole 10H of the bobbin 10.

All of a center axis of the opening 40H of the thermal expansion adjustment member 40, the center axis of the center hole 10H of the bobbin 10, and an optical axis of the optical lens 20 (the center axis of the convex part 21) coincide or substantially coincide with each other.

The ring-shaped thermal expansion adjustment member 40 is constant or substantially constant in width and thickness. The thickness of the thermal expansion adjustment member 40 is about 500 µm as one example.

The thermal expansion adjustment member 40 is made of a material with a coefficient of thermal expansion equal to or near the coefficient of thermal expansion of the optical material of the optical lens 20 so that the optical lens 20 is not affected by expansion and contraction of the bobbin 10 caused by a temperature change.

By using the same material as the optical material of the optical lens 20 for the thermal expansion adjustment member 40 (adjustment material), the selection of the material can be eased and it is possible to reduce the thermal stress applied to the optical lens 20 by the thickness of the thermal expansion adjustment member 40.

Note that, by choosing the adjustment material so that the difference of the coefficient of thermal expansion between the adjustment material and a plastic material becomes larger than that between the optical lens 20 and the plastic material of the bobbin 10 and optimizing the thickness of the thermal expansion member 40, it is possible to eliminate the thermal stress applied to the optical lens.

Specifically, when the thermal expansion adjustment member 40 is being pulled by the thermal expansion of the plastic material of the bobbin 10, by choosing the material and the thickness of the thermal expansion adjustment member 40 so that the expansion rate of the thermal expansion adjustment member 40 becomes approximately equal to the coefficient of thermal expansion of the optical lens 20, it is possible to eliminate the thermal stress in the optical lens 20.

Thus, in the optical head 110, by interposing the thermal expansion adjustment member 40 between the bobbin 10 and the optical lens 20, the thermal stress generated in the optical lens 20 can be reduced, the concentration of stress at the groove 29 of the optical lens 20 can be reduced, and the reliability of the optical head 110 can be improved.

Second Embodiment of Optical Head

Figure 3:
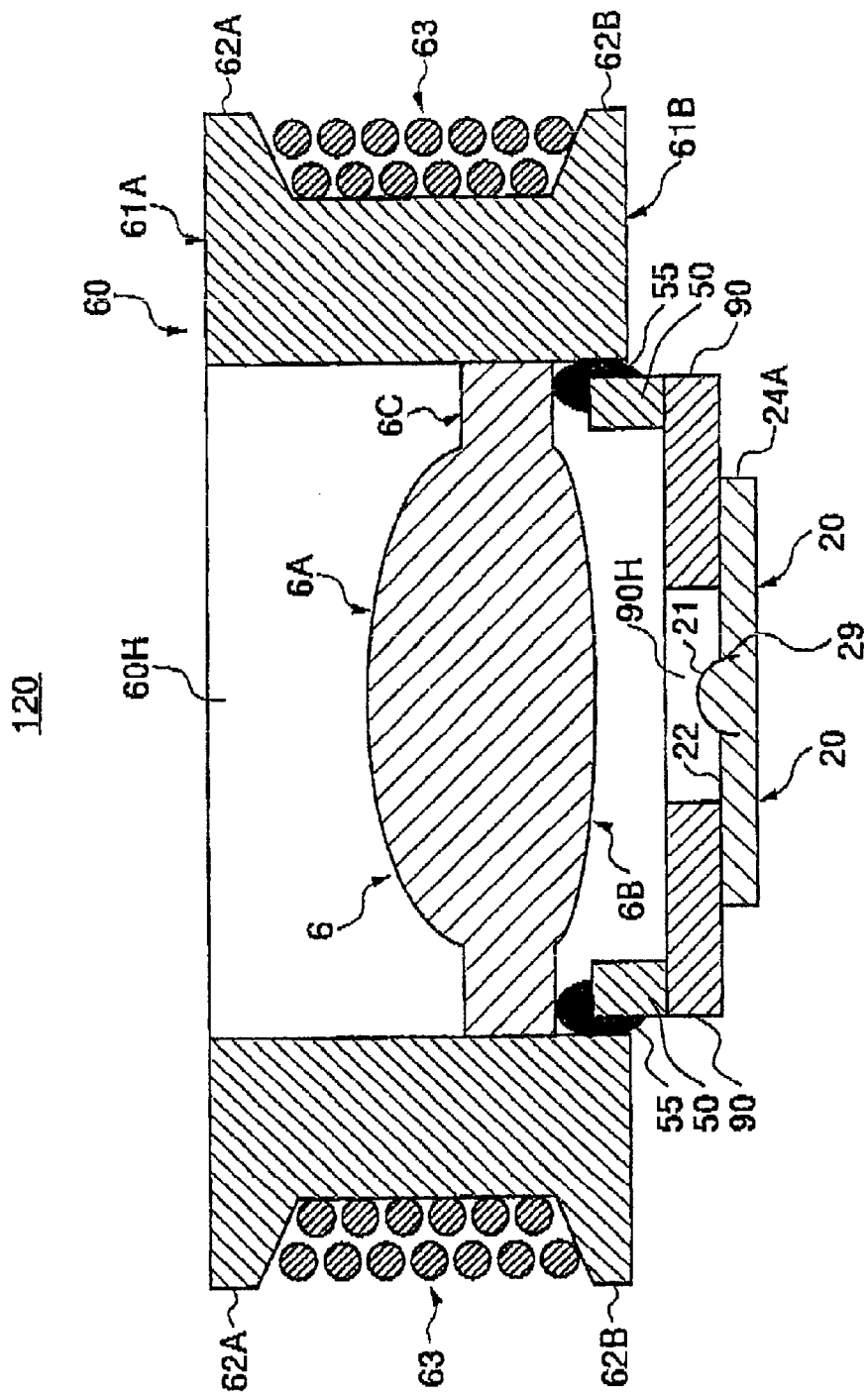
FIG. 3 is a sectional view of a second embodiment of an optical head according to the present invention.

FIG. 3 is a view of the configuration of a second embodiment of an optical head according to the present invention and a schematic cross-section of the optical head.

This optical head 120 has a bobbin 60, optical lenses 6 and 20, a thermal expansion adjustment member 90, and a spacer 50 formed by a plastic. Note that the optical lens 20 in FIG. 3 is the same as the optical lens 20 in FIG. 2 and thus the description is suitably omitted.

At an outer circumference of the bobbin 60, a convex part 62A is formed along one surface (upper surface) 61A of the bobbin 60 and a convex part 62B is formed along the other surface (lower surface) 61B of the bobbin. A center hole 60H is formed at the bobbin 60, and a center axis of this center hole 60H is perpendicular or approximately perpendicular to the upper and lower surfaces 61A and 61B of the bobbin 60.

In the bobbin 60, a coil 63 is wound at a concave part between circumferential edges formed by the convex parts 62A and 62B. By arranging magnets outside of the coil 63 and supplying a driving current to the coil 63, it is possible to move the bobbin 60 and the optical lenses 6 and 20 as one part.

One surface (upper surface) of the ring-shaped thermal expansion adjustment member 90 is in close contact with the lower surface of the ring-shaped spacer, while the other surface (lower surface) of the thermal expansion adjustment member 90 is in close contact with the flat surface of the flat part 22 of the optical lens 20.

The ring-shaped spacer 50 is adhered to an inner wall of the bobbin 60 by an adhesive 55. The width and the thickness of the ring-shaped spacer 50 is constant or substantially constant.

The optical lens 20 is placed so that the convex part 21 fits in an opening 90H of the thermal expansion adjustment member 90. The height of the convex part 21 from the flat part 22 is lower than the thickness of the thermal expansion adjustment member 90. The coefficient of thermal expansion of the optical lens 20 is smaller than that of the bobbin 60.

Further, the optical lens 20 is placed so that the center axis of the convex part 21 or the extension thereof passes through the center hole 60H of the bobbin 60.

All of a center axis of the opening 90H of the thermal expansion adjustment member 90, the center axis of the center hole 60H of the bobbin 60, and optical axes of the optical lenses 6 and 20 coincide or substantially coincide with each other.

The optical lens 6 has a convex part 6A of one surface, a convex part 6B of the other surface, and an outer circumference part 6C positioned around the convex parts 6A and 6B.

A circumferential edge of the outer circumference part 6C of the optical lens 6 contacts or substantially contacts the inner wall of the bobbin 60 and the outer circumference part 6C is adhered to the inner wall of the bobbin 60 by the adhesive 55. Note that the outer circumference part 6C may bite into the inner wall of the bobbin 60.

The ring-shaped thermal expansion adjustment member 90 is constant or substantially constant in width and thickness. The coefficient of thermal expansion is equal to or near the coefficient of thermal expansion of the optical material of the optical lens 20 so that the optical lens 20 is not affected by expansion and contraction of the bobbin 60 and/or the spacer 50 caused by a temperature change.

By using the same material as the optical material of the optical lens 20 for the thermal expansion adjustment member 90 (adjustment material), the selection of the material can be eased and at is possible to reduce the thermal stress applied to the optical lens 20 by the thickness of the thermal expansion adjustment member 90.

Thus, in the optical head 120, by interposing the thermal expansion adjustment member 90 between the bobbin 60 and/or the spacer 50 and the optical lens 20, the thermal stress generated in the optical lens 20 can be reduced, the concentration of stress at the groove 29 of the optical lens 20 can be reduced, and the reliability of the optical head 120 can be improved.

FIG. 4 is a view of the configuration of an optical head according to a related art of the present invention and a schematic cross-section of the optical head.

This optical head 130 has the bobbin 60, the optical lenses 6 and 20, and a ring-shaped spacer 51 formed by a plastic. Note that, in the optical head 130 in FIG. 4, the same references are assigned for the parts of the same configuration as the optical head 120 in FIG. 3 and the descriptions of the parts of the same configuration are suitably omitted.

A circumferential wall 51C of the ring-shaped spacer 51 is adhered to the inner wall of the bobbin 60 by the adhesive 55. A bottom surface (lower surface) of the spacer 51 is in close contact with the flat surface of the flat part 22 of the optical lens 20.

The optical lens 20 is placed so that the convex part 21 fits in an opening 51H of the spacer 51. All of a center axis of the opening 51H of the spacer 51, the center axis of the center hole 60H of the bobbin 60, and the optical axes of the optical lenses 6 and 20 coincide or substantially coincide with each other.

In this optical head 130, since the thermal expansion of the spacer 51 is transmitted to the optical lens 20 directly, thermal stress easily occurs in the optical lens 20 and stress easily concentrates at the groove 29 around the convex part 21. Therefore, there is an advantage in the optical head 120 in FIG. 3 over the optical head 130 in FIG. 4 in that the optical head 120 can reduced the concentration of stress at the groove 29 of the optical lens 20.

Method for Producing Optical Lens 20

Next, a method for producing the optical lens 20 will be described.

FIGS. 5A to 5D are explanatory views of the method for producing the optical lens 20 in FIGS. 2 to 4.

Figure 5A:
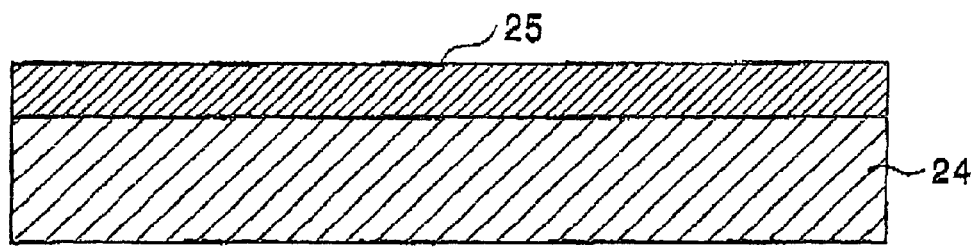
FIGS. 5A to 5D are explanatory views of steps of production of the optical lens in FIGS. 2 to 4.

In FIG. 5A, a mask material 25 is coated onto a substrate 24 formed by an optical material. The mask material 25 is formed by a photosensitive material (or photoresist) and coated to a predetermined thickness by spin coating etc. The thickness of the mask material 25 is about 25 $\mu$m as one example.

Figure 5B:
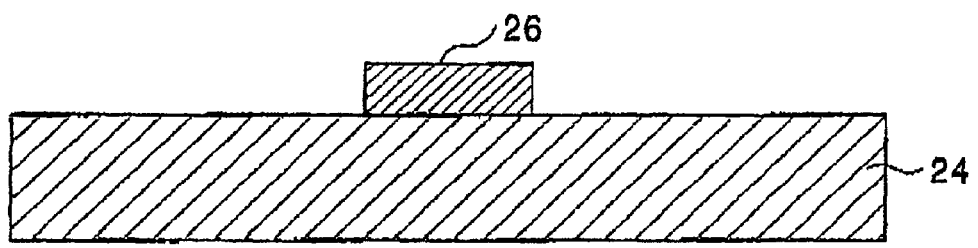

In FIG. 5B, the mask material 25 on the substrate 24 in FIG. 5A is patterned to form a mask layer 26. The mask material 25 is patterned by exposure and development for example. The diameter of the mask layer 26 is about 100 $\mu$m to about 250 $\mu$m as one example.

Figure 5C:
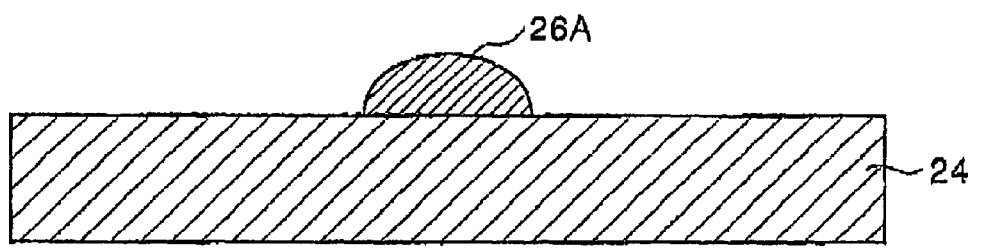

In FIG. 5C, the substrate 24 (or the mask layer 26 on the substrate 24) in FIG. 5B is heat treated to cause the mask layer 26 to deform so that the surface area becomes smaller due to surface tension etc. and to cause it to deform to a convex shape having a gentle curved surface.

By the heat treatment, the mask layer 26 in FIG. 5B becomes the shape of a mask layer 26A in FIG. 5C. The mask layer 26A has a circular convex shape (a convex lens shape).

Figure 5D:
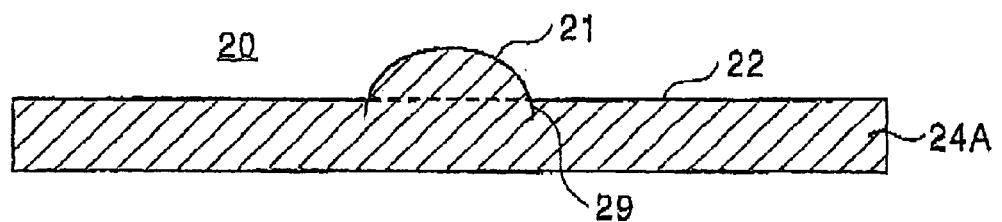

In FIG. 5D, the shape of the mask layer 26A in FIG. 5C is transferred to the substrate 24 to form the substrate 24A and thus form the optical lens 20. For example, reactive ion etching (RIE) or other etching is used to transfer the shape of the mask layer 26A to the substrate 24 and thus form the optical lens 20. Note, an NLD apparatus or an ICP apparatus described below can be used in the etching for forming the convex part 21.

The convex part 21 is formed by transferring the shape of the mask layer 26A, while the flat part 22 is formed by transferring the shape of the surroundings of the mask layer 26A. The surface of the flat part 22 is flat or approximately flat. The groove 29 is formed at a circumference of the convex part 21 and clearly separates the convex part 21 and the flat part 22.

According to the method of production shown in FIGS. 5A to 5D, it is possible to form the thin planar substrate 24A having the convex part 21 functioning as the convex lens.

In the method of production of FIGS. 5A to 5D, as one example, the mask material is made by a material having a glass transition temperature (Tg point) of about 45° C. to about 55° C. and is heat treated in a range of about 110° C. to about 150° C.

Further, in order to enable the mask layer 26 to deform roundly by the heat treatment to an extent giving an optically smooth surface, the material of the mask material 25 is made a material with a Tg point lower than the heat treatment temperature.

Furthermore, when forming the shape of the mask layer 26 on the substrate 24 by dry etching or another process, it is necessary for the a mask layer 26A not to change in quality after the heat treatment. Therefore, the heat treatment temperature is made a temperature at which the mask layer 26A does not charge in quality. For example, the heat treatment temperature is made a temperature lower than a carbonization temperature of the mask layer 26.

If the mask layer deforms 26 in a storage state of the mask layer 26 formed with the mask layer 26, reproduction of the process (reproducibility) becomes difficult. Further, if the mask layer 26 deforms in the dry etching process, reproduction of the process becomes difficult.

For this reason, the mask material 25 is made a material having a Tg point higher than the storage temperature (room temperature or ordinary temperature) or processing temperature (near room temperature or near ordinary temperature).

Generally, the Tg point is the temperature indicating the boundary at which the material becomes a glass state, i.e., a state not having a determined structure and able to flow, so considering the stability of the process, it is desired that the heat treatment temperature be a temperature higher than the Tg point by a certain margin.

That is, in order to cause the mask layer 26 to deform by the heat treatment so that its surface area becomes smaller (make the mask layer 26 a fluid state by the heat treatment and make the mask layer 26 deform by the surface tension of the mask layer 26), it is desired for the heat treatment temperature to be made 10's of degrees centigrade higher than the Tg point.

As one example, by making the heat treatment temperature a temperature at least about 40° C. higher than the Tg point, it is possible to cause the mask layer 26 to roundly deform within one hour for example and thus possible to produce the optical lens (optical element) 20 efficiently.

Note that, from a similar viewpoint, in the relation between the storage temperature or the processing temperature and the Tg point, the difference between the storage temperature or the processing temperature and the Tg point should be within several 10's of degrees centigrade.

Third Embodiment of Optical Head

FIG. 6 is a view of the configuration of a third embodiment of an optical head according to the present invention and a schematic cross-section of the optical head.

This optical head 210 has the bobbin 10, an optical lens 30, and the thermal expansion adjustment member 40.

At the outer circumference of the bobbin 10, the convex part 12A is formed along one surface (upper surface) 11A of the bobbin 10 and the convex part 12B is formed along the other surface (lower surface) 11B of the bobbin. The center hole 10H is formed at the bobbin 10. The center axis of this center hole 10H is perpendicular or approximately perpendicular to the upper and lower surfaces 11A and 11B of the bobbin 10.

In the bobbin 10, the coil 13 is wound at the concave part between circumferential edges formed by the convex parts 12A and 12B. By arranging magnets outside of the coil 13 and supplying a driving current to the coil 13, it is possible to move the bobbin 10 and the optical lens 30 as one part.

The optical lens 30 has a substrate 34A formed by an optical material such as silica-based glass etc. This substrate 34A has a convex part 31 functioning as a convex lens, a flat part 32 positioned around this convex part 31, and an outer circumference part 33 positioned around the flat part 32. The coefficient of thermal expansion of the optical lens 30 is smaller than that of the bobbin 10.

A thickness of the substrate 34A at the flat part 32 is constant or approximately constant and less than the thickness of the substrate 34A at the convex part 31.

The thickness of the outer circumference part 33 is greater than that of the convex part 31 and greater than that of the flat part 32. As one example, the thickness of the outer circumference part 33 may be about 130 μm and the thickness of the thermal expansion adjustment member 40 about 500 μm.

At an outer circumference of the convex part 31 is formed a groove 39 called a "trench" when forming the convex part 31 by the etching. This groove 39 clearly separates the convex part 31 and the flat part 32.

The upper surface (front surface) of the outer circumference part 33 is formed with a mask layer 37B formed by an inorganic material to be flat or approximately flat.

The lower surface 11B of the bobbin 10 is in close contact with one flat surface (upper surface) of the ring-shaped thermal expansion adjustment member 40, while the other flat surface (lower surface) of the ring-shaped thermal expansion adjustment member 40 is in close contact with an upper surface (concretely, the mask layer 37B) of the outer circumference part 33.

The optical lens 30 is placed so that the convex part 31 protrudes toward an opening 40H of the thermal expansion adjustment member 40.

Further, the optical lens 30 is placed so that a center axis of the convex part 31 or an extension thereof passes through the center hole 10H of the bobbin 10.

All of a center axis of the opening 40H of the thermal expansion adjustment member 40, the center axis of the center hole 10H of the bobbin 10, and an optical axis of the optical lens 30 coincide or substantially coincide with each other.

The ring-shaped thermal expansion adjustment member 40 is constant or substantially constant in width and thickness. The thermal expansion adjustment member 40 is made of a material with a coefficient of thermal expansion equal to or near the coefficient of thermal expansion of the optical material of the optical lens 30 so that the optical lens 30 is not affected by expansion and contraction of the bobbin 10 caused by a temperature change.

By using the same material as the optical material of the optical lens 30 for the thermal expansion adjustment member 40 (adjustment material), the selection of the material can be eased and it is possible to reduce the thermal stress applied to the optical lens 30 by the thickness of the thermal expansion adjustment member 40.

Note that, by choosing an adjustment material so that the difference of the coefficient of thermal expansion between the adjustment material and a plastic material becomes larger than that between the optical lens 30 and the plastic material of the bobbin 10 and optimizing the thickness of the thermal expansion member 40, it is possible to eliminate the thermal stress applied to the optical lens 30.

Specifically, when the thermal expansion adjustment member 40 is being pulled by the thermal expansion of the plastic material of the bobbin 10, by choosing the material and the thickness of the thermal expansion adjustment member 40 so that an expansion rate of the thermal expansion adjustment member 40 becomes approximately equal to the coefficient of thermal expansion of the optical lens 30, it is possible to eliminate the thermal stress in the optical lens 30.

Thus, in the optical head 210, by interposing the thermal expansion adjustment member 40 between the bobbin 10 and the optical lens 30, the thermal stress generated in the optical lens 30 can be reduced, the concentration of stress at the groove 39 of the optical lens 30 can be reduced, and it is possible to improve the reliability of the optical head 210.

Fourth Embodiment of Optical Head

FIG. 7 is a view of the configuration of a fourth embodiment of an optical head according to the present invention and a schematic cross-section of the optical head.

This optical head 220 has the bobbin 10, the optical lens 30, and a ring-shaped thermal expansion adjustment member 41. Note that, in the optical head 220 in FIG. 7, the same references are assigned for parts of the same configuration as the optical head 210 in FIG. 6 and the descriptions of the parts of the same configuration are suitably omitted.

The lower surface 11B of the bobbin 10 is in close contact with one flat surface (upper surface) of the planar-shaped thermal expansion adjustment member 41, while the other flat surface (lower surface) of the planar-shaped thermal expansion adjustment member 41 is in close contact with an upper surface (concretely, the mask layer 37B) of the outer circumference part 33.

The convex part 31 of the optical lens 30 protrudes to the side of the thermal expansion adjustment member 41. Further, the optical lens 30 is placed so that the center axis of the convex part 31 or the extension thereof passes through the center hole 10H of the bobbin 10. The center axis of the center hole 10H of the bobbin 10 and the optical axis of the optical lens 30 coincide or substantially coincide. Note that, the center axis of the convex part 31 is perpendicular or substantially perpendicular to the upper and lower surfaces of the planar-shaped thermal expansion adjustment member 41.

The planar-shaped thermal expansion adjustment member 41 formed by an optical member is constant or substantially constant in width and thickness. As one example, the thickness of the thermal expansion adjustment member 41 is about 500 μm.

The thermal expansion adjustment member 41 is made of a material with a coefficient of thermal expansion equal to or near the coefficient of thermal expansion of the optical material of the optical lens 30 so that the optical lens 30 is not affected by expansion and contraction of the bobbin 10 caused by a temperature change.

By using the same material as the optical material of the optical lens 30 for the thermal expansion adjustment member 41 (adjustment material), the selection of the material can be eased and it is possible to reduce the thermal stress applied to the optical lens 30 by the thickness of the thermal expansion adjustment member 41.

Note that, by choosing an adjustment material so that the difference of the coefficient of thermal expansion between the adjustment material and the plastic material becomes larger than that between the optical lens 30 and the plastic material of the bobbin 10 and optimizing the thickness of the thermal expansion member 41, it is possible to eliminate the thermal stress applied to the optical lens 30.

Specifically, when the thermal expansion adjustment member 41 is being pulled by the thermal expansion of the plastic material of the bobbin 10, by choosing the material and the thickness of the thermal expansion adjustment member 41 so that an expansion rate of the thermal expansion adjustment member 41 becomes approximately equal to the coefficient of thermal expansion of the optical lens 30, it is possible to eliminate the thermal stress in the optical lens 30.

Thus, in the optical head 220, by interposing the thermal expansion adjustment member 41 between the bobbin 10 and the optical lens 30, the thermal stress generated in the optical lens 30 can be reduced, the concentration of stress at the groove 39 of the optical lens 30 can be reduced, and it is possible to improve the reliability of the optical head 220.

Fifth Embodiment of Optical Head

FIG. 8 is a view of the configuration of a fifth embodiment of an optical head according to the present invention and a schematic cross-section of the optical head.

This optical head 230 has a bobbin 70 and the optical lens 30. Note that, the optical lens 30 in FIG. 8 has the same configuration as the optical lens 30 in FIG. 6 and FIG. 7 and thus the description is suitably omitted.

At an outer circumference of the bobbin 70, a convex part 72A is formed along one surface (upper surface) 71A of the bobbin 70 and a convex part 72B is formed along the other surface (lower surface) 71B of the bobbin 70. A center hole 70H is formed at the bobbin 70. A center axis of this center hole 70H is perpendicular or approximately perpendicular to the upper and lower surfaces 71A and 71B of the bobbin 70.

In the bobbin 70, a coil 73 is wound at a concave part between circumferential edges formed by the convex parts 72A and 72B. By arranging magnets outside of the coil 73 and supplying a driving current to the coil 73, it is possible to move the bobbin 70 and the optical lens 30 as one part.

The mask layer 37B of the outer circumference part 33 of the optical lens 30 is in close contact with the lower surface 71B of the bobbin 70. The coefficient of thermal expansion of the optical lens 30 is smaller than that of the bobbin 70.

The convex part 31 of the optical lens 30 protrudes to the side of the center hole 70H of the bobbin 70. The optical lens 30 is placed so that the center axis of the convex part 31 or the extension thereof passes through the center hole 70H of the bobbin 70. The center axis of the center hole 70H of the bobbin 70 and the optical axis of the optical lens 30 coincide or substantially coincide.

In this optical head 230, use is made of the thick outer circumference part 33 of the optical head 30 so that the optical lens 30 is not affected or substantially not affected by expansion and contraction of the bobbin 70 caused by a temperature change.

In the optical head 230, the expansion and the contraction of the bobbin 70 are transmitted to the flat part 32 adjusted at the outer circumference part 33. Compared with the case where the flat part around the convex part is fixed to the bottom surface of the bobbin directly, the thermal stress in the optical lens can be reduced and the concentration of stress at the groove around the convex part can be reduced. Further, the thermal stress applied to the groove 39 of the optical lens 30 can be reduced by the thickness of the outer circumference part 33.

Thus, in the optical head 230, since the thick outer circumference part 33 of the optical lens 30 is fixed to the bobbin 70, the thermal stress generated in the flat part 32 of the optical lens 30 can be reduced, the concentration of stress at the groove 39 of the optical lens 30 can be reduced, and it is possible to improve the reliability of the optical head 230.

Method for Producing Optical Lens 30

Next, a method for producing the optical lens 30 will be described.

FIGS. 9A to 9E are explanatory views of the method for producing the optical lens 30 in FIGS. 6 to 8.

Figure 9A:
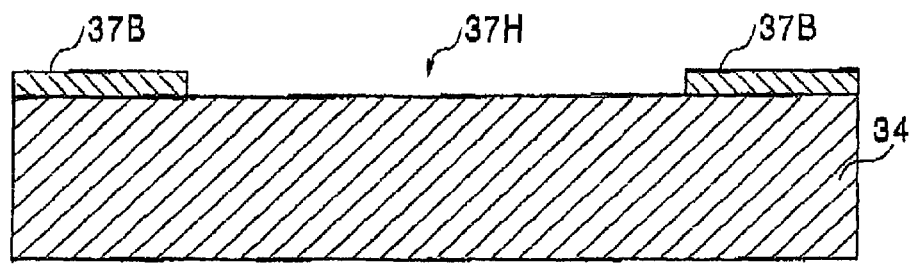
FIGS. 9A to 9E are explanatory views of steps of production of the optical lens in FIGS. 6 to 8.

In FIG. 9A, a second mask layer 37B having an opening 37H is formed on a substrate 34 formed by an optical material. This second mask layer 37B is formed by an etching-resistant material and has a thickness of about 0.1 $\mu$m as one example. The second mask layer 37B may be formed for example by a metal material such as platinum or may be formed by a hard mask.

Figure 9B:
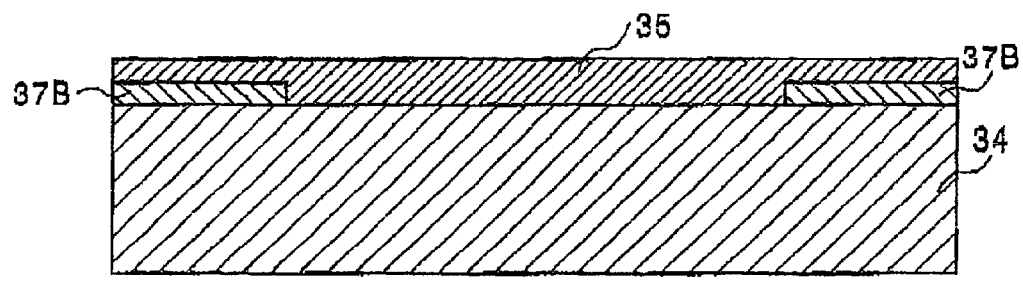

In FIG. 9B, a mask material 35 is coated onto a substrate 34 in FIG. 9A. The mask material 35 is formed by a photosensitive material (or photoresist) for example and coated to a predetermined thickness by spin coating etc. The thickness of the mask material 35 is about 25 $\mu$m as one example.

Figure 9C:
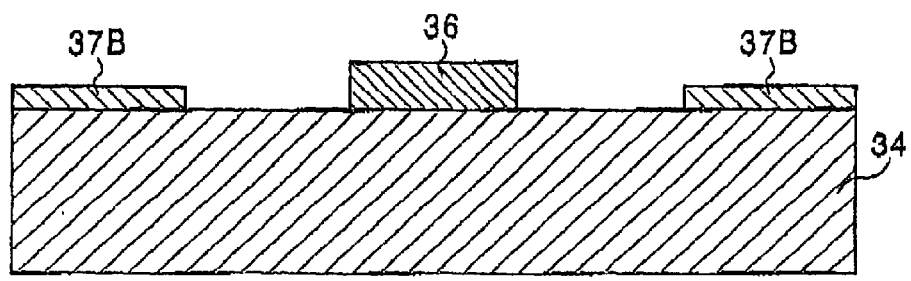

In FIG. 9C, the mask material 35 on the substrate 34 in FIG. 9B is patterned to form a first mask layer 36 and expose the second mask layer 37B. The mask material 35 is patterned by exposure and development for example. The diameter of the first mask layer 36 is about 100 $\mu$m to about 250 $\mu$m as one example.

Figure 9D:
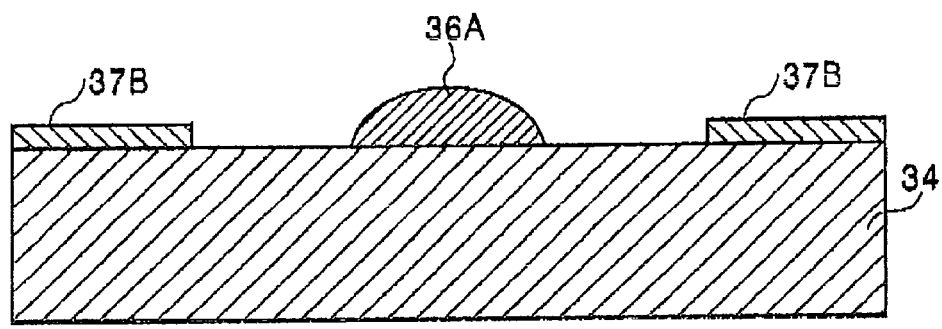

In FIG. 9D, the substrate 34 (or the first mask layer 36 on the substrate 34) in FIG. 9C is heat treated to cause the first mask layer 36 to deform so that the surface area becomes smaller due to surface tension etc. and to cause it to deform to a convex shape having a gentle curved surface.

By the heat treatment, the mask layer 36 in FIG. 9C becomes the shape of a mask layer 36A in FIG. 9D. The mask layer 36A has a circular convex shape (a convex lens shape).

Figure 9E:
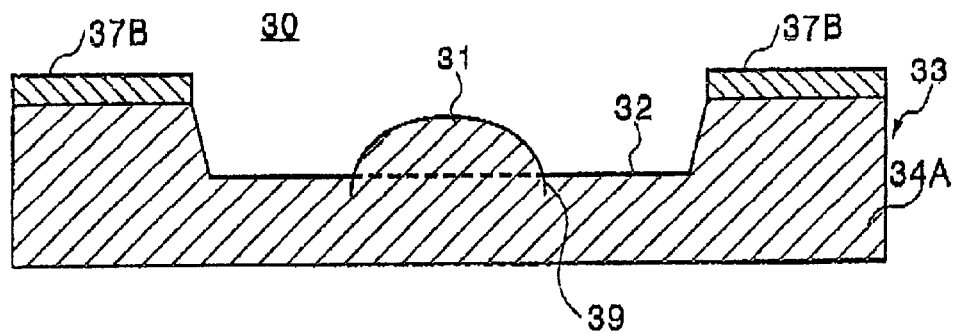

In FIG. 9E, the shape of the mask layer 36A in FIG. 9D is transferred to the substrate 34 to form the substrate 34A and thus form the optical lens 30.

For example, RIE or other etching is used to transfer the shape of the mask layer 36A to the substrate 34 and thus form the optical lens 30. The mask layer 37B is formed by a material not etched or difficult to etch or small in etching rate at the time of etching to form the convex part 31.

The etching for forming the convex part 31 is, for example, performed by a plasma etching apparatus using a high density plasma source called a magnetic neutral loop discharge plasma (NLD) apparatus. Note that for the NLD apparatus, H. Tsuboi, M. Itoh, M. Tanabe, T. Hayashi, and T. Uchida: *Jpn. J. Appl. Phys.* 34 (1995) 2476 may be referred to.

Alternatively, the etching is performed by a plasma etching apparatus using a high density plasma source called an inductively coupled plasma (ICP) apparatus. Note that for the ICP apparatus, J. Hopwood, Plasma Source, *Sci. & Technol.* 1 (1992) 109. and T. Fukusawa, A. Nakamura, H. Shindo, and Y. Horiike: Jpn. *J. Appl. Phys.* 33 (1994), 2139 may be referred to.

The convex part 31 is formed by transferring the shape of the mask layer 36A, the flat part 32 is formed by transferring the shape between the mask layers 36A and 37B, and an outer circumference part 33 is masked by the mask layer 37B and not etched. The surface of the outer circumference part 33 is flat or approximately flat.

The groove 39 is formed in an outer circumference of the convex part 31. This groove 39 clearly defines the boundary of the convex part 31 and the flat part 32.

According to the method of production shown in FIGS. 9A to 9E, it is possible to form the convex part 31 functioning as a convex lens and form the thick outer circumference part 33. Further, since the precision of the patterning of the mask material 35 can be maintained high, the convex part 31 and the outer circumference part 33 can be formed by a high positional accuracy. As a result, the thin flat part 32 positioned around the convex part 31 can be made smaller and for example the flat part 32 can be made narrower to the resolution of the photosensitive material.

Further, the thickness at the outer circumference part 33 can be made greater than the thickness at the convex part 31, so it is possible for the optical element 30 to be further improved in mechanical strength and to be further raised in the resonance frequency of the vibration in the thickness direction of the substrate 34A and thus made difficult to resonate.

Further, in the optical element 30, by having the thick outer circumference part 33 formed around the flat part 32 and using the method of production in FIGS. 9A to 9E, it is possible to produce an optical element having a shape difficult to produce by glass molding.

Note that the second mask layer 37B in FIG. 9A can be formed by a lift-off method. This process of formation entails use of a remover etc. for the photoresist, so if the mask material 35 is an organic material such as a photosensitive material, it is desired to arrange the process of formation of the second mask layer 37B before the process of formation of the mask material 35.

Further, the second mask layer 37B is desirably not processed in the processing of the substrate 34A of FIG. 9E, so as the process of FIG. 9E, RIE which makes use of a chemical reaction is preferable to ion milling.

In the method of production in FIGS. 9A to 9E, as one example, the mask material 35 is made using a material having a glass transition temperature (Tg point) of about 45° C. to about 55° C. and heat treated in a range of about 110° C. to about 150° C.

Further, in order to enable the first mask layer 36 to deform to a circular shape to an extent giving an optically smooth surface, the material of the mask material 35 is made a material with a Tg point lower than the heat treatment temperature.

Furthermore, when forming the shape of the first mask layer 36 in the substrate 34 by dry etching or another process, it is necessary for the mask layer 36A not to change in quality after the heat treatment. Therefore, the heat treatment temperature is made a temperature at which the mask layer 36A does not change in quality. For example, the heat treatment temperature is made a temperature lower than a carbonization temperature of the first mask layer 36.

If the mask layer 36 deforms in a storage state of the substrate 34 formed with the mask layers 36 and 37B, reproduction of the process (reproducibility) becomes difficult. Further, if the mask layers 36 and 37B deform in the dry etching process, reproduction of the process becomes difficult.

For this reason, the mask material 35 is made a material having a Tg point higher than the storage temperature (room temperature or ordinary temperature) or processing temperature (near room temperature or near ordinary temperature).

From the viewpoint of the stability of the process, it is desired that the heat treatment temperature be a temperature higher than the Tg point by a certain margin.

That is, in order to cause the mask layer 36 to deform by the heat treatment so that its surface area becomes smaller (make the mask layer 36 a fluid state by the heat treatment and make the mask layer 36 deform by the surface tension of the mask layer 36), it is desired for the heat treatment temperature to be made 10's of degrees centigrade higher than the Tg point.

As one example, by making the heat treatment temperature a temperature at least about 40° C. higher than the Tg point, it is possible to cause the mask layer 36 to roundly deform within one hour for example and thus possible to produce the optical lens 30 efficiently.

Note that, from a similar viewpoint, in the relation between the storage temperature or the processing temperature and the Tg point, the difference between the storage temperature or the processing temperature and the Tg point should be within several 10's of degrees centigrade.

Optical Pickup

FIG. 10 is a schematic structural view of a first embodiment of an optical pickup having the optical head according to the present invention.

This optical pickup 119 has a laser diode 4, a collimater lens 5, a beam splitter 3, a ¼ wavelength plate (a λ/4 plate) 9, a condenser lens 7, a photodetector 8, the optical head 110, and magnets 111. Since the configuration of the optical head 110 had been already described in relation to FIG. 2, the description will be omitted.

This optical head 110 is moveable in a focus direction and/or a tracking direction due to the magnetic field generated by the coil 13 of the optical head 110 making use of the magnets 111 arranged near the coil 13. The magnets 111 and the coil 13 configure an actuator for moving the bobbin 10.

The laser diode 4 outputs a laser beam comprised of linearly polarized light in response to a drive signal SL and supplies the output laser beam to the collimater lens 5.

The collimater lens 5 converts the laser beam from the laser diode 4 into parallel light and supplies it to the beam splitter 3.

The beam splitter 3 passes the laser beam from the collimater lens 5 and supplies the laser beam to the optical head 110 via the ¼ wavelength plate 9.

In the optical head 110, the laser beam passing through the ¼ wavelength plate 9 is supplied to the convex part 21 through the center hole 10H of the bobbin 10.

The optical lens 20 functions as an object lens. Its convex part 21 condenses the laser beam from the ¼ wavelength plate 9 and supplies it to a track of an optical disc 80. Thus, the laser beam from the laser diode 4 is focused on a recording surface of the optical disc 80.

Further, the optical head 110 receives the laser beam reflected at the optical disc 80 and returns the same to the beam splitter 3 via the ¼ wavelength plate 9.

The beam splitter 3 receives the laser beam from the optical head 110 and directs it to the condenser lens 7.

The condenser lens 7 condenses the laser beam from the beam splitter 3 and supplies the condensed laser beam to the photodetector 8.

The photodetector 8 receives the laser beam from the condenser lens 7 at a receiving part and generates an output signal SA. The photodetector 8 is configured by, for example, a quartering photodetector (four division photodetector) which generates signals for calculating a tracking error signal, a focus error signal, an RF signal, or other signal.

Figure 1:
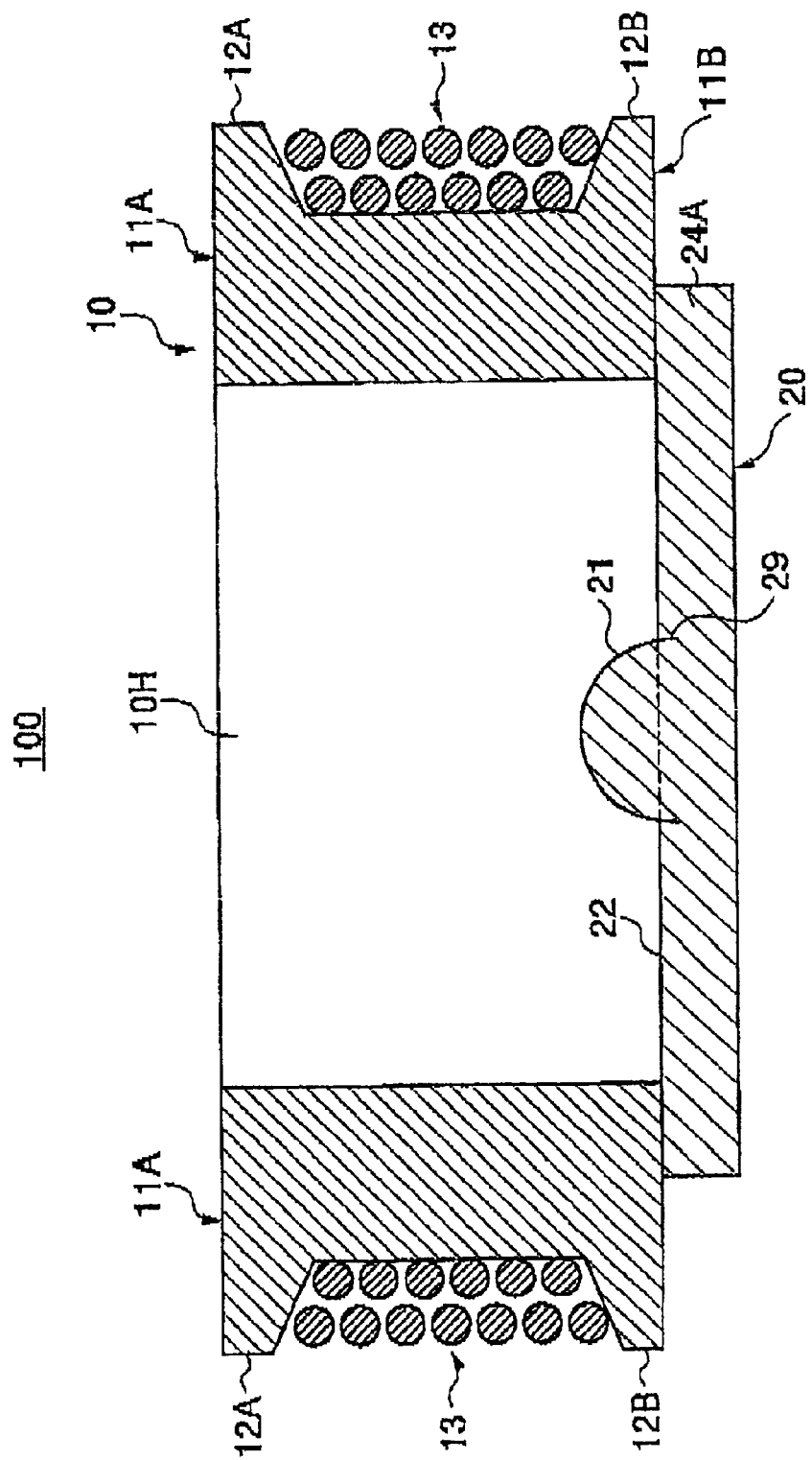
FIG. 1 is a sectional view of an optical head according to the related art of the present invention.

In the optical pickup 119 of FIG. 10, by using the optical head 110 having the thermal expansion adjustment member 40, it is possible to extend the range of temperature in which the optical pickup 119 can be used in comparison with the optical pickup using the optical head 100 in FIG. 1 and possible to improve reliability.

Figure 11:
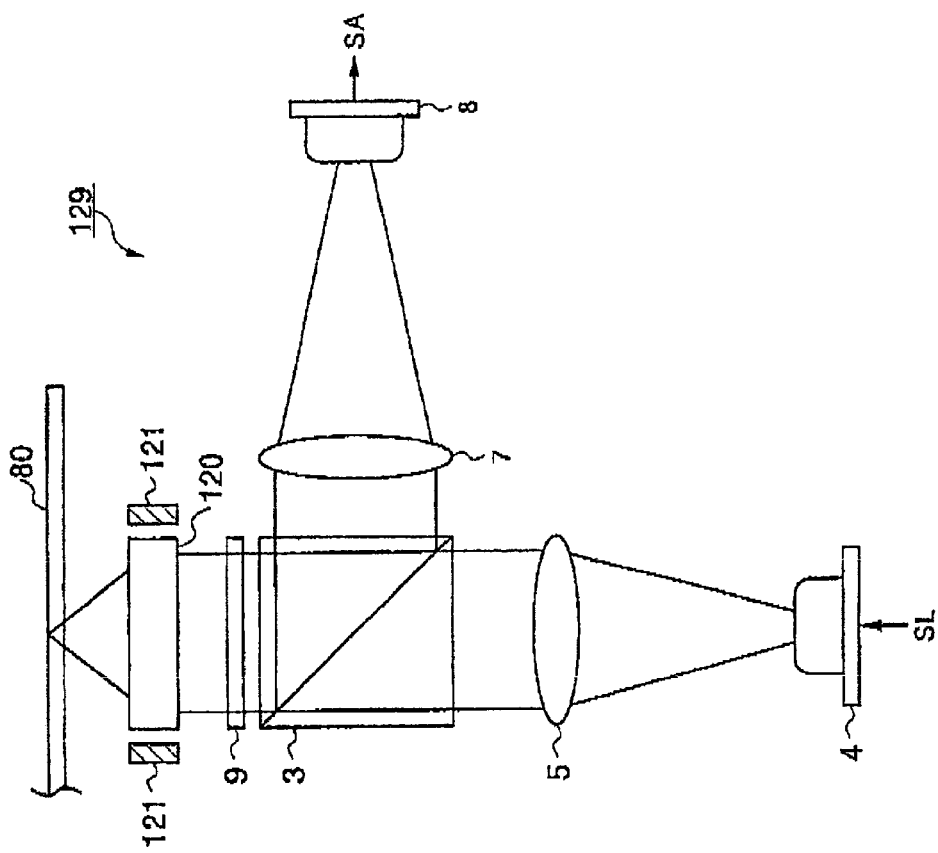
FIG. 11 is a schematic structural view of a second embodiment of an optical pickup having an optical head according to the present invention.

FIG. 11 is a schematic structural view of a second embodiment of an optical pickup having the optical head according to the present invention.

This optical pickup 129 has the laser diode 4, the collimater lens 5, the beam splitter 3, the ¼ wavelength plate (the λ/4 plate) 9, the condenser lens 7, the photodetector 8, the optical head 120, and magnets 121. Since the configuration of the optical head 120 has been already described in relation to FIG. 3, the description will be omitted.

This optical head 120 is moveable in the focus direction and/or the tracking direction due to the magnetic field generated by the coil 63 of the optical head 120 with making use of the magnets 121 arranged near the coil 63. The magnets 121 and the coil 63 configure an actuator for moving the bobbin 60.

The laser diode 4 outputs a laser beam comprised of linearly polarized light in response to the drive signal SL and supplies the output laser beam to the collimater lens 5.

The collimater lens 5 converts the laser beam from the laser diode 4 into parallel light and supplies it to the beam splitter 3.

The beam splitter 3 passes the laser beam from the collimater lens 5 and supplies the laser beam to the optical lens 6 of the optical head 120 via the ¼ wavelength plate 9.

The optical lens 6 supplies the laser beam from the ¼ wavelength plate 9 to the convex part 21 of the optical lens 20. The optical lens 6 and the optical lens 20 function as an object lens.

The convex part 21 of the optical lens 20 condenses the laser beam from the optical lens 6 and supplies it to the track of the optical disc 80 Thus, the laser beam from the laser diode 4 is focused on the recording surface of the optical disc 80.

Further, the optical head 120 receives the laser beam reflected at the optical disc 80 and returns the same to the beam splitter 3 via the ¼ wavelength plate 9.

The beam splitter 3 receives the laser beam from the optical head 120 and directs it to the condenser lens 7.

The condenser lens 7 condenses the laser beam from the beam splitter 3 and supplies the condensed laser beam to the photodetector 8.

The photodetector 8 receives the laser beam from the condenser lens 7 at the receiving part and generates the output signal SA. The photodetector 8 is configured by, for example, a quartering photodetector which generates signals for calculating the tracking error signal, the focus error signal, the RF signal, or other signal.

In the optical pickup 129 of FIG. 11, by using the optical head 120 having the thermal expansion adjustment member 90, it is possible to extend the range of temperature in which the optical pickup 129 can be used in comparison with the optical pickup using the optical head 130 in FIG. 4 and possible to improve the reliability.

Figure 12:
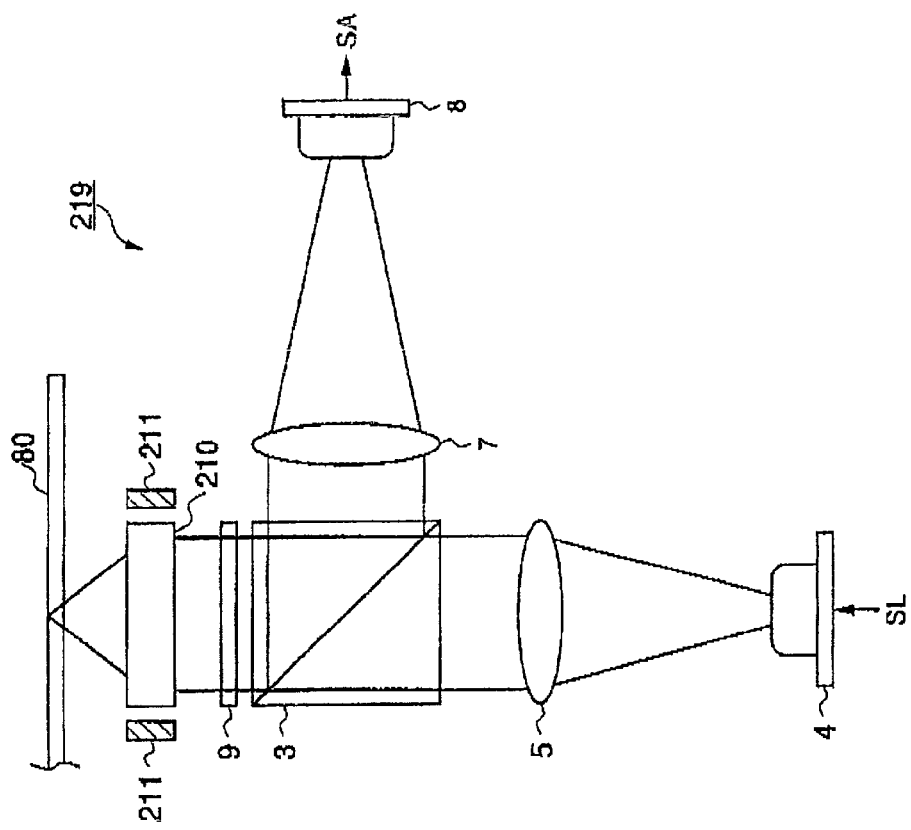
FIG. 12 is a schematic structural view of a third embodiment of an optical pickup having an optical head according to the present invention.

FIG. 12 is a schematic structural view of a third embodiment of an optical pickup having the optical head according to the present invention.

This optical pickup 219 has the laser diode 4, the collimater lens 5, the beam splitter 3, the ¼ wavelength plate (the λ/4 plate) 9, the condenser lens 7, the photodetector 8, the optical head 210, and magnets 211. Since the configuration of the optical head 210 has been already described in relation to FIG. 6, the description will be omitted.

This optical head 210 is moveable in the focus direction and/or the tracking direction due to the magnetic field generated by the coil 13 of the optical head 210 making use of the magnets 211 arranged near the coil 13. The magnets 211 and the coil 13 configure an actuator for moving the bobbin 10.

The laser diode 4 outputs a laser beam comprised of linearly polarized light in response to the drive signal SL and supplies the output laser beam to the collimater lens 5.

The collimater lens 5 converts the laser beam from the laser diode 4 parallel light and supplies it to the beam splitter 3.

The beam splitter 3 passes the laser beam from the collimater lens 5 and supplies the laser beam to the optical head 210 via the ¼ wavelength plate 9.

In the optical head 210, the laser beam passing through the ¼ wavelength plate 9 is supplied to the convex part 31 through the center hole 10H of the bobbin 10 and the opening 40H of the thermal expansion adjustment member 40.

The optical lens 30 functions as an object lens. The convex part of the optical lens 30 condenses the laser beam from the ¼ wavelength plate 9 and supplies it to the track of the optical disc 80. Thus, the laser beam from the laser diode 4 is focused on the recording surface of the optical disc 80.

Further, the optical head 210 receives the laser beam reflected at the optical disc 80 and returns the same to the beam splitter 3 via the ¼ wavelength plate 9.

The beam splitter 3 receives the laser beam from the optical head 210 and directs it to the condenser lens 7.

The condenser lens 7 condenses the laser beam from the beam splitter 3 and supplies the condensed laser beam to the photodetector 8.

The photodetector 8 receives the laser beam from the condenser lens 7 at the receiving part and generates the output signal SA. The photodetector 8 is configured by, for example, a quartering photodetector which generates signals for calculating the tracking error signal, the focus error signal, the RF signal, or other signal.

In the optical pickup 219 of FIG. 12, by using the optical head 210 having the thermal expansion adjustment member 40, it is possible to extend the range of temperature in which the optical pickup 219 can be used in comparison with the optical pickup using the optical head 100 in FIG. 1 and possible to improve the reliability. Further, due to the rise of the resonance frequency of the optical lens 30, it is possible to record and/or reproduce data by a high transfer rate.

Figure 13:
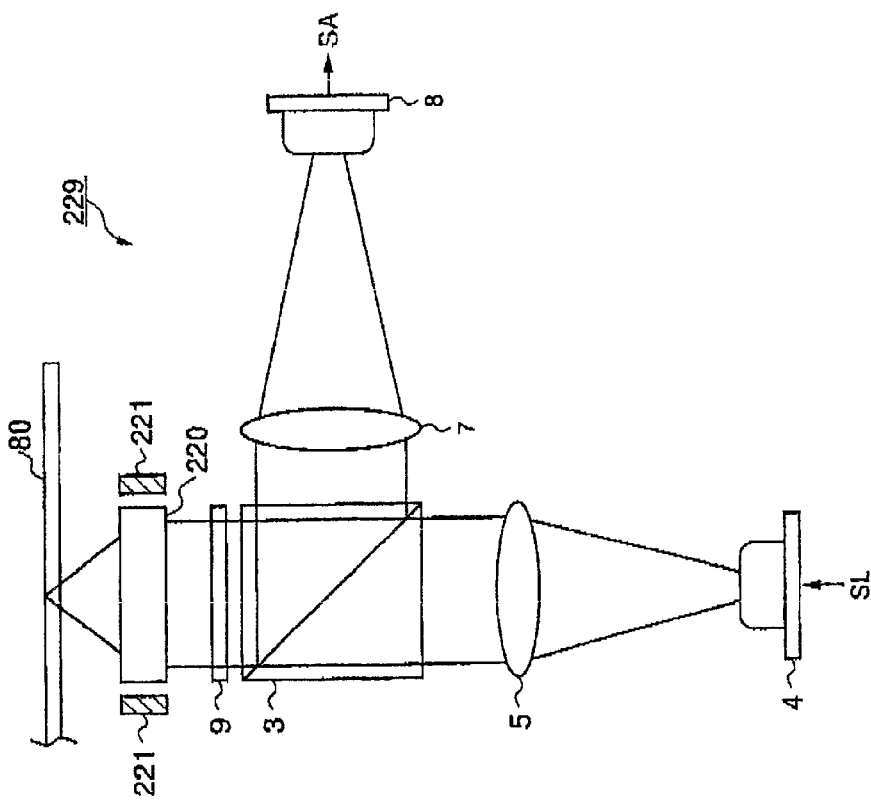
FIG. 13 is a schematic structural view of a fourth embodiment of an optical pickup having an optical head according to the present invention.

FIG. 13 is a schematic structural view of a fourth embodiment of an optical pickup having the optical head according to the present invention.

This optical pickup 229 has the laser diode 4, the collimater lens 5, the beam splitter 3, the ¼ wavelength plate (the λ/4 plate) 9, the condenser lens 7, the photodetector 8, the optical head 220, and magnets 221. Since the configuration of the optical head 220 has been already described in relation to FIG. 7, the description will be omitted.

This optical head 220 is moveable in the focus direction and/or the tracking direction due to the magnetic field generated by the coil 13 of the optical head 220 making use of the magnets 221 arranged near the coil 13. The magnets 221 and the coil 13 configure an actuator for moving the bobbin 10.

The laser diode 4 outputs a laser beam comprised of linearly polarized light in response to the drive signal SL and supplies the output laser beam to the collimater lens 5.

The collimater lens 5 converts the laser beam from the laser diode 4 to parallel light and supplies it to the beam splitter 3.

The beam splitter 3 passes the laser beam from the collimater lens 5 and supplies the laser beam to the optical head 220 via the ¼ wavelength plate 9.

In the optical head 220, the laser beam passing through the ¼ wavelength plate 9 is supplied to the convex part 31 through the center hole 10H of the bobbin 10 and the thermal expansion adjustment member 41.

The optical lens 30 functions as an object lens. Its convex part 31 condenses the laser beam from the ¼ wavelength plate 9 and supplies it to the track of the optical disc 80. Thus, the laser beam from the laser diode 4 is focused on the recording surface of the optical disc 80.

Further, the optical head 220 receives the laser beam reflected at the optical disc 80 and returns the same to the beam splitter 3 via the ¼ wavelength plate 9.

The beam splitter 3 receives the laser beam from the optical head 220 and directs it to the condenser lens 7.

The condenser lens 7 condenses the laser beam from the beam splitter 3 and supplies the condensed laser beam to the photodetector 8.

The photodetector 8 receives the laser beam from the condenser lens 7 at the receiving part and generates the output signal SA. The photodetector 8 as configured by, for example, a quartering photodetector which generates signals for calculating the tracking error signal, the focus error signal, the RF signal, or other signal.

In the optical pickup 229 of FIG. 13, by using the optical head 220 having the thermal expansion adjustment member 41, it is possible to extend the range of temperature in which the optical pickup 229 can be used in comparison with the optical pickup using the optical head 100 in FIG. 1 and possible to improve the reliability. Further, due to the rise of the resonance frequency of the optical lens 30, it is possible to record and/or reproduce data by a high transfer rate.

Figure 14:
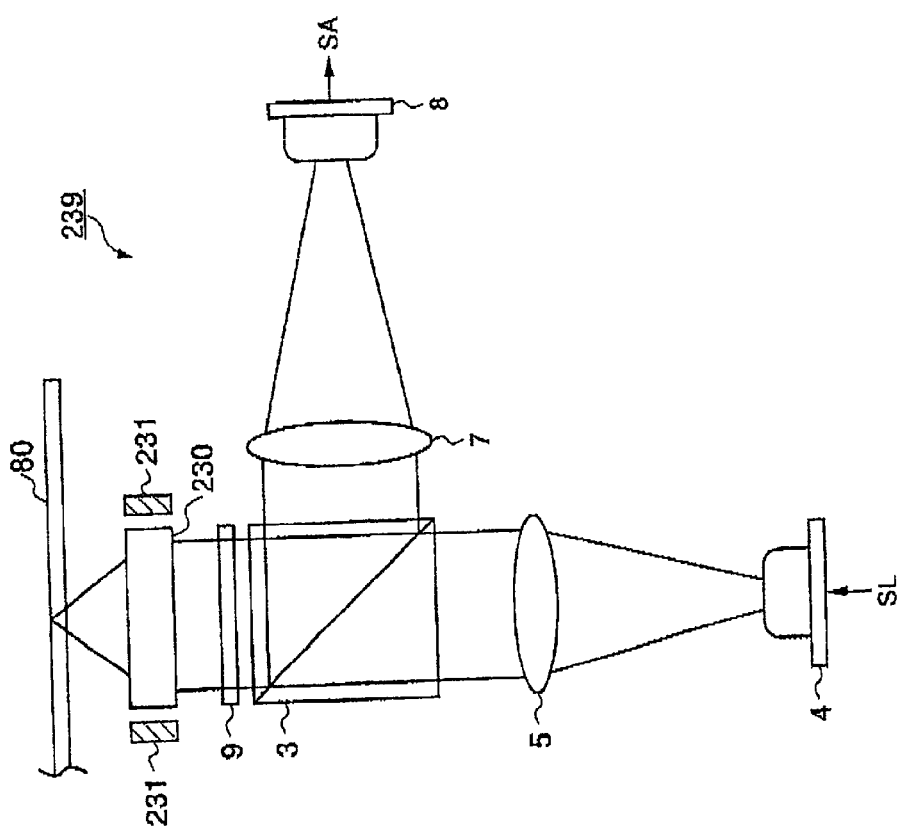
FIG. 14 is a schematic structural view of a fifth embodiment of an optical pickup having an optical head according to the present invention.

FIG. 14 is a schematic structural view of a fifth embodiment of an optical pickup having the optical head according to the present invention.

This optical pickup 239 has the laser diode 4, the collimater lens 5, the beam splitter 3, the ¼ wavelength plate (the λ/4 plate) 9, the condenser lens 7, the photodetector 8, the optical head 230, and magnets 231. Since the configuration of the optical head 230 has been already described in relation to FIG. 8, the description will be omitted.

This optical head 230 is moveable in the focus direction and/or the tracking direction due to the magnetic field generated by the coil 73 of the optical head 230 making use of the magnets 231 arranged near the coil 73. The magnets 231 and the coil 73 configure an actuator for moving the bobbin 70.

The laser diode 4 outputs a laser beam comprised of linearly polarized light in response to the drive signal SL and supplies the output laser beam to the collimater lens 5.

The collimater lens 5 converts the laser beam from the laser diode 4 to parallel light and supplies it to the beam splitter 3.

The beam splitter 3 passes the laser beam from the collimater lens 5 and supplies the laser beam to the optical head 230 via the ¼ wavelength plate 9.

In the optical head 230, the laser beam passing through the ¼ wavelength plate 9 is supplied to the convex part 31 through the center hole 70H of the bobbin 70.

The optical lens 30 functions as an object lens. Its convex part 31 condenses the laser beam from the ¼ wavelength plate 9 and supplies it to the track of the optical disc 80. Thus, the laser beam from the laser diode 4 is focused on a recording surface of the optical disc 80.

Further, the optical head 230 receives the laser beam reflected at the optical disc 80 and returns the same to the beam splitter 3 via the ¼ wavelength plate 9.

The beam splitter 3 receives the laser beam from the optical head 230 and directs it to the condenser lens 7.

The condenser lens 7 condenses the laser beam from the beam splitter 3 and supplies the condensed laser beam to the photodetector 8.

The photodetector 8 receives the laser beam from the condenser lens 7 at the receiving part and generates an output signal SA. The photodetector 8 is configured by, for example, the quartering photodetector which generates signals for calculating the tracking error signal, the focus error signal, the RF signal, or other signal.

In the optical pickup 239 of FIG. 14, by using the optical head 230, it is possible to extend the range of temperature in which the optical pickup 239 can be used in comparison with the optical pickup using the optical head 100 in FIG. 1 and possible to improve the reliability. Further, due to the rise of the resonance frequency of the optical lens 30, it is possible to record and/or reproduce data by a high transfer rate.

Note that, in the optical head 210 in FIG. 6, the upper surface of the outer circumference part 33 of the optical lens 30 from which the mask layer 37B has been removed can be fixed to the thermal expansion adjustment member 40.

In the optical head 220 in FIG. 7, the upper surface of the outer circumference part 33 of the optical lens 30 from which the mask layer 37B has been removed can be fixed to the thermal expansion adjustment member 41.

In the optical head 230 in FIG. 8, the upper surface of the outer circumference part 33 of the optical lens 30 from which the mask layer 37B has been removed can be fixed to the lower surface 71B of the bobbin 70.

As described above, according to the present invention, it is possible to provide an optical head able to reduce the thermal stress generated in the optical lens mounted on the bobbin and possible to provide an optical pickup having the optical head.

Note that the above embodiments are merely examples of the present invention. The present invention is not limited to the above embodiments.

What is claimed is:

1. An optical head having:

a bobbin formed with a center hole and a first optical lens mounted on said bobbin via a thermal expansion adjustment member formed with an opening, said first optical lens having a substrate formed by an optical, material different from said bobbin in coefficient of thermal expansion, said substrate having:

a convex part functioning as a convex lens and a flat part positioned around said convex part, said flat part is fixed to said thermal expansion adjustment member so that said convex part fits in said opening, and said first optical lens is placed so that a center axis of said convex part or an extension thereof passes through the center hole of said bobbin, wherein the coefficient of thermal expansion of said thermal expansion adjustment member is a value between the coefficient of thermal expansion of said bobbin and the coefficient of thermal expansion of said first optical lens.

2. An optical head as set forth in claim 1, wherein said thermal expansion adjustment member is fixed to said bobbin.

3. An optical head as set forth in claim 1, wherein said thermal expansion adjustment member is fixed to said bobbin via a spacer.

4. An optical head as set forth in claim 1, wherein a second optical lens is arranged at the center hole of said bobbin.

5. An optical head having:

a bobbin formed with a center hole and a first optical lens mounted on said bobbin via a thermal expansion adjustment member formed with an opening, said first optical lens having a substrate formed by an optical material different from said bobbin in coefficient of thermal expansion, said substrate having:

a convex part functioning as a convex lens and a flat part positioned around said convex part, said flat part is fixed to said thermal expansion adjustment member so that said convex part fits in said opening, and said first optical lens is placed so that a center axis of said convex part or an extension thereof passes through the center hole of said bobbin, wherein said thermal expansion adjustment member is an optical material having a constant or substantially constant thickness and is formed by the same material as the optical material of said first optical lens and the height of said convex part from the surface of said flat part is lower than the thickness of said thermal expansion adjustment member.

6. An optical head having:

a bobbin formed with a center hole and a first optical lens mounted on said bobbin via a thermal expansion adjustment member formed with an opening, said first optical lens having a substrate formed by an optical material different from said bobbin in coefficient of thermal expansion, said substrate having:

a convex part functioning as a convex lens and a flat part positioned around said convex part, said flat part is fixed to said thermal expansion adjustment member so that said convex part fits in said opening, and said first optical lens is placed so that a center axis of said convex part or an extension thereof passes through the center hole of said bobbin, wherein:

the center axis of said convex part coincides or substantially coincides with the center axis of the center hole of said bobbin;

a groove is formed around said convex part;

a coil is wound around an outer circumference of said bobbin;

the material of said bobbin is plastic; and the material of said first optical lens is glass.

7. An optical head having:

a bobbin formed with a center hole and an optical lens mounted on said bobbin via a thermal expansion adjustment member, said optical lens having a substrate formed by an optical material different from said bobbin in coefficient of thermal expansion, said substrate having:

a convex part functioning as a convex lens;

a flat part positioned around said convex part; and an outer circumference part positioned around said flat part, wherein a thickness of said outer circumference part is greater than that of said convex part;

said outer circumference part is fixed to said thermal expansion adjustment member, and said optical lens is placed so that a center axis of said convex part or an extension thereof passes through the center hole of said bobbin.

8. An optical head as set forth in claim 7, wherein a coefficient of thermal expansion of said thermal expansion adjustment member is a value between the coefficient of thermal expansion of said bobbin and the coefficient of thermal expansion of said optical lens.

9. An optical head as set forth in claim 7, wherein said thermal expansion adjustment member is fixed to said bobbin.

10. An optical head as set forth in claim 7, wherein said thermal expansion adjustment member is an optical material having a constant or substantially constant thickness and is formed by the same material as the optical material of said optical lens.

11. An optical head as set forth in claim 7, wherein said thermal expansion adjustment member is formed with an opening and said optical lens is placed so that said convex part protrudes to said opening.

12. An optical head as set forth in claim 7, wherein a mask layer is formed on a surface of said outer circumference part and said mask layer of said outer circumference part is fixed to said thermal expansion adjustment member.

13. An optical head as set forth in claim 7, wherein the center axis of said convex part coincides or substantially coincides with the center axis of the center hole of said bobbin;

a groove is formed around said convex part;

a coil is wound around an outer circumference of said bobbin;

the material of said bobbin is plastic; and the material of said optical lens is glass.

14. An optical head having:

a bobbin formed with a center hole and an optical lens, said optical lens having a substrate formed by an optical material different from said bobbin in coefficient of thermal expansion, said substrate having:

a convex part functioning as a convex lens;

a flat part positioned around said convex part; and an outer circumference part positioned around said flat part, wherein a thickness of said outer circumference part is greater than that of said convex part;

said outer circumference part is fixed to said bobbin; and said optical lens is placed so that a center axis of said convex part or an extension thereof passes through the center hole of said bobbin.

15. An optical head as set forth in claim 14, wherein a mask layer is formed on a surface of said outer circumference part and said mask layer of said outer circumference part is fixed to said bobbin.

16. An optical head as set forth in claim 14, wherein the center axis of said convex part coincides or substantially coincides with the center axis of the center hole of said bobbin;

a groove is formed around said convex part;

a coil is wound around an outer circumference of said bobbin;

the material of said bobbin is plastic; and the material of said optical lens is glass.

17. An optical pickup having:

an optical head functioning as an object lens part when mounted in a recording and/or reproducing apparatus of an optical storage medium and a photodetector for receiving a reflected light beam for use in recording and/or reproduction to and from the optical storage medium, said optical head having a bobbin formed with a center hole and a first optical lens mounted on said bobbin via a thermal expansion adjustment member formed with an opening, said first optical lens having a substrate formed by an optical material different from said bobbin in coefficient of thermal expansion, said substrate having a convex part functioning as a convex lens and a flat part positioned around said convex part, said flat part is fixed to said thermal expansion adjustment member so that said convex part fits in said opening, and said first optical lens is placed so that a center axis of said convex part or an extension thereof passes through the center hole of said bobbin, wherein the coefficient of thermal expansion of said thermal expansion adjustment member is a value between the coefficient of thermal expansion of said bobbin and the coefficient of thermal expansion of said first optical lens.

18. An optical pickup as set forth in claim 17, wherein said thermal expansion adjustment member is fixed to said bobbin.

19. An optical pickup as set forth in claim 17, wherein said thermal expansion adjustment member is fixed to said bobbin via a spacer.

20. An optical pickup as set forth in claim 17, wherein a second optical lens is placed at the center hole of said bobbin and a light beam is supplied irradiated from a recording and/or reproducing light beam generating apparatus and passed through said second optical lens to said first optical lens.

21. An optical pickup having:

an optical head functioning as an object lens part when mounted in a recording and/or reproducing apparatus of an optical storage medium and a photodetector for receiving a reflected light beam for use in recording and/or reproduction to and from the optical storage medium, said optical head having a bobbin formed with a center hole and a first optical lens mounted on said bobbin via a thermal expansion adjustment member formed with an opening, said first optical lens having a substrate formed by an optical material different from said bobbin in coefficient of thermal expansion, said substrate having a convex part functioning as a convex lens and a flat part positioned around said convex part, said flat part is fixed to said thermal expansion adjustment member so that said convex part fits in said opening, and said first optical lens is placed so that a center axis of said convex part or an extension thereof passes through the center hole of said bobbin, wherein said thermal expansion adjustment member is an optical material having a constant or substantially constant thickness and is formed by the same material as said first optical lens and the height of said convex part from the surface of said flat part is lower than the thickness of said thermal expansion adjustment member.

22. An optical pickup having:

an optical head functioning as an object lens part when mounted in a recording and/or reproducing apparatus of an optical storage medium and a photodetector for receiving a reflected light beam for use in recording and/or reproduction to and from the optical storage medium, said optical head having a bobbin formed with a center hole and a first optical lens mounted on said bobbin via a thermal expansion adjustment member formed with an opening, said first optical lens having a substrate formed by an optical material different from said bobbin in coefficient of thermal expansion, said substrate having a convex part functioning as a convex lens and a flat part positioned around said convex part, said flat part is fixed to said thermal expansion adjustment member so that said convex part fits in said opening, and said first optical lens is placed so that a center axis of said convex part or an extension thereof passes through the center hole of said bobbin, further having a magnet, the center axis of said convex part coincides or substantially coincides with the center axis of the center hole of said bobbin, a groove is formed around said convex part, a coil is wound around an outer circumference of said bobbin, the material of said bobbin is plastic, the material of said first optical lens is glass, and said magnet and said coil configure an actuator for moving said bobbin.

23. An optical pickup having:

an optical head functioning as an object lens part when mounted in a recording and/or reproducing apparatus of an optical storage medium and a photodetector for receiving a reflected light beam for use in recording and/or reproduction to and from the optical storage medium, said optical head having a bobbin formed with a center hole and an optical lens mounted on said bobbin via a thermal expansion adjustment member, said optical lens having a substrate formed by an optical material different from said bobbin in coefficient of thermal expansion, said substrate having:

a convex part functioning as a convex lens;

a flat part positioned around said convex part; and an outer circumference part positioned around said flat part, a thickness of said outer circumference part is greater than that of said convex part, said outer circumference part is fixed to said thermal expansion adjustment member, and said optical lens is placed so that a center axis of said convex part or an extension thereof passes through the center hole of said bobbin.

24. An optical pickup as set forth in claim 23, wherein a coefficient of thermal expansion of said thermal expansion adjustment member is a value between the coefficient of thermal expansion of said bobbin and the coefficient of thermal expansion of said optical lens.

25. An optical head as set forth in claim 23, wherein said thermal expansion adjustment member is fixed to said bobbin.

26. An optical pickup as set forth in claim 23, wherein said thermal expansion adjustment member is an optical material having a constant or substantially constant thickness and is formed by the same material as said optical lens and a light beam is supplied irradiated from a recording and/or reproducing light beam generating apparatus and passed through said thermal expansion adjustment member.

27. An optical pickup as set forth in claim 23, wherein said thermal expansion adjustment member is formed with an opening and said optical lens is placed so that said convex part protrudes to said opening.

28. An optical pickup as set forth in claim 23, wherein a mask layer is formed on a surface of said outer circumference part and said mask layer of said outer circumference part is fixed to said thermal expansion adjustment member.

29. An optical pickup as set forth in claim 23, further having a magnet, the center axis of said convex part coincides or substantially coincides with the center axis of the center hole of said bobbin, a groove is formed around said convex part, the material of said bobbin is plastic, the material of said optical lens is glass, and said magnet and said coil configure an actuator for moving said bobbin.

30. An optical pickup having:

an optical head functioning as an object lens part when mounted in a recording and/or reproducing apparatus of an optical storage medium and a photodetector for receiving a reflected light beam for use in recording and/or reproduction to and from the optical storage medium, said optical head having a bobbin formed with a center hole and an optical lens, said optical lens having a substrate formed by an optical material different from said bobbin in coefficient of thermal expansion, said substrate having:

a convex part functioning as a convex lens;

a flat part positioned around said convex part; and an outer circumference part positioned around said flat part, said outer circumference part is fixed to said bobbin, and said optical lens is placed so that a center axis of said convex part or an extension thereof passes through the center hole of said bobbin, further having a magnet, the center axis of said convex part coincides or substantially coincides with the center axis of the center hole of said bobbin, a groove is formed around said convex part, the material of said bobbin is plastic, the material of said optical lens is glass, and said magnet and said coil configure an actuator for moving said bobbin.

31. An optical pickup as set forth in claim 30, wherein a mask layer is formed on a surface of said outer circumference part and said mask layer of said outer circumference part is fixed to said bobbin.

* * * * *